US012748782B1

(12) United States Patent
Mogill

(10) Patent No.: US 12,748,782 B1
(45) Date of Patent: Sep. 29, 2026

(54) SYSTEMS FOR AND METHODS OF NATURAL LANGUAGE CLASSIFICATION AND ADAPTIVE ROUTING OF DOMAIN-SPECIFIC DATA OBJECTS

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/419,798

(22) Filed: Dec. 15, 2025

(51) Int. Cl.
*G06F 16/28* (2019.01)

(52) U.S. Cl.
CPC .......... *G06F 16/285* (2019.01); *G06F 16/282* (2019.01)

(58) Field of Classification Search
CPC .. G06F 16/285; G06F 16/282; G06F 16/2264; G06F 16/3347; G06N 20/10; G06N 20/00; G06N 3/08
USPC ....... 707/737, 738, 739, 748, 758, 769, 770, 707/999.005, E17.002, 722, 728, 741, 707/749, 777, 798, 999.003
See application file for complete search history.

(56) References Cited

U.S. PATENT DOCUMENTS 10,157,347 B1 * 12/2018 Kasturi .................. G06N 20/10
12,326,867 B2 * 6/2025 Krishnan .......... G06F 16/24578
12,417,823 B1 9/2025 Parthasarathy et al.
2006/0025995 A1 2/2006 Erhart et al.
2019/0370394 A1 12/2019 Li et al.
2019/0392078 A1 * 12/2019 Methani .............. G06F 16/3347
2021/0383231 A1 * 12/2021 Liu ........................ G06N 20/00
2023/0133127 A1 * 5/2023 Balabine ............... G06F 16/285 707/739
2025/0383970 A1 * 12/2025 Bhat ....................... G06F 8/443

FOREIGN PATENT DOCUMENTS

IN 202231054491 A 12/2022
IN 202341060860 A 10/2023

* cited by examiner

*Primary Examiner* — Md I Uddin
(74) *Attorney, Agent, or Firm* — CALDWELL LLC

(57) ABSTRACT

A system includes at least a processor and a memory communicatively connected to the at least a processor. The memory contains instructions configuring the at least a processor to: receive a domain-specific data object including natural-language content and associated metadata, map, using a language processing module, the domain-specific data object into a vector space representation, and classify, using a classification module, the vector space representation to at least one node of a ontology structure defining a plurality of hierarchical specialization nodes. The processor is further configured to generate, using a routing module, a routing confidence score as a function of a specialty coefficient, which is associated with the at least one node of the ontology structure and is derived from destination-specific metadata, and route, using the routing module, the vector space representation to a destination node as a function of the routing confidence score.

16 Claims, 7 Drawing Sheets

SYSTEMS FOR AND METHODS OF NATURAL LANGUAGE CLASSIFICATION AND ADAPTIVE ROUTING OF DOMAIN-SPECIFIC DATA OBJECTS

FIELD OF THE INVENTION

The present invention generally relates to the field of applied artificial intelligence and intelligent information routing. In particular, the present invention is directed to systems for and methods of natural language classification and adaptive routing of domain-specific data objects.

BACKGROUND

Existing natural language processing systems used for domain classification or data routing often rely on static keyword-based matching or shallow vector similarity techniques that treat incoming text as unstructured tokens. Such approaches lack mechanisms for representing hierarchical relationships among domain concepts or for integrating multiple sources of structured metadata during classification. Moreover, conventional routing algorithms typically operate on fixed parameters and do not adapt in response to variations in model performance or destination-specific outcomes. As a result, generic processing pipelines exhibit low accuracy, poor scalability, and limited capacity to learn from feedback when determining optimal routing decisions within complex, multi-node computational environments.

SUMMARY OF THE DISCLOSURE

Some aspects of this innovation relate to a routing protocol configured to direct referral data according to granular practice area sub-domains, such as trucking litigation, medical malpractice, and/or family law. Natural language processing techniques are employed to extract and classify case metadata, transforming text-based descriptions into structured representations within a domain-specific ontology. A routing engine applies specialization coefficients or weightings derived from firm-level expertise data to determine optimal referral destinations. Outcome metrics and post-routing feedback may be continuously integrated into the model, allowing iterative recalibration of specialization alignment and routing precision over time.

In some aspects, the techniques described herein relate to a system for natural language classification and adaptive routing of domain-specific data objects, the system including: at least a processor and a memory communicatively connected to the at least a processor, wherein the memory contains instructions configuring the at least a processor to: receive a domain-specific data object including natural-language content and associated metadata, map, using a language processing module, the domain-specific data object into a vector space representation, classify, using a classification module, the vector space representation to at least one node of a ontology structure, wherein the ontology structure defines a plurality of hierarchical specialization nodes, generate, using a routing module, a routing confidence score as a function of a specialty coefficient associated with the at least one node of the ontology structure, wherein the specialty coefficient is derived from destination-specific metadata, and route, using the routing module, the vector space representation to a destination node as a function of the routing confidence score.

In some aspects, the techniques described herein relate to a method of natural language classification and adaptive routing of domain-specific data objects, the method including: receiving, using the at least a processor, a domain-specific data object including natural-language content and associated metadata, mapping, using a language processing module, the domain-specific data object into a vector space representation, classifying, using a classification module, the vector space representation to at least one node of a ontology structure, wherein the ontology structure defines a plurality of hierarchical specialization nodes, generating, using a routing module, a routing confidence score as a function of a specialty coefficient associated with the at least one node of the ontology structure, wherein the specialty coefficient is derived from destination-specific metadata, and routing, using the routing module, the vector space representation to a destination node as a function of the routing confidence score.

The disclosed embodiments provide one or more technical improvements by enhancing computational efficiency and precision in the automated routing of domain-specific data by introducing an architecture that integrates semantic encoding, hierarchical ontology mapping, and feedback-driven model recalibration. Unlike conventional referral or classification systems that rely on static keyword matching or rule-based logic, the present architecture, advantageously, projects natural-language inputs into a vector space representation, enabling nuanced semantic comparison across multiple specialization layers. The hierarchical ontology structure desirably allows for multi-level classification that preserves contextual relationships between parent and sub-specialty domains, while the routing subsystem dynamically computes and adjusts specialty coefficients based on destination-specific performance data. Advantageously, this integrated design reduces routing latency, minimizes misclassification across related sub-domains, and continuously optimizes destination selection accuracy through adaptive recalibration of model parameters. Other technical improvements that address challenges in the field of applied artificial intelligence and intelligent information routing may be found throughout the disclosure as will be recognized by those skilled in the art.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems or and methods of natural-language classification and adaptive routing of domain-specific data objects within a computing environment. In an embodiment, the system projects incoming natural-language content and structured metadata into a vector-space representation, classifies the resulting representation within a hierarchical classification graph, and routes the classified representation to one or more destination nodes as a function of computed confidence scores.

Aspects of the present disclosure, in one or more embodiments, can be used to improve the computational accuracy and efficiency of routing operations performed on unstructured text data. Aspects of the present disclosure, in one or more embodiments, can also be used to enable adaptive recalibration of model parameters based on feedback derived from performance outcomes. This is so, at least in part, because one or more embodiments of the disclosed architecture combine vector-space representations, hierarchical graph relationships, and destination-specific feature data to compute routing decisions using dynamically updated coefficients that reflect observed performance trends.

Aspects of one or more embodiments of the present disclosure, advantageously, allow for continuous optimization of data-driven routing pipelines by integrating feedback into successive classification and routing cycles, thereby improving model precision over time without manual intervention. Exemplary embodiments illustrating aspects of the present disclosure are described below in the context of several specific examples.

Figure 1:
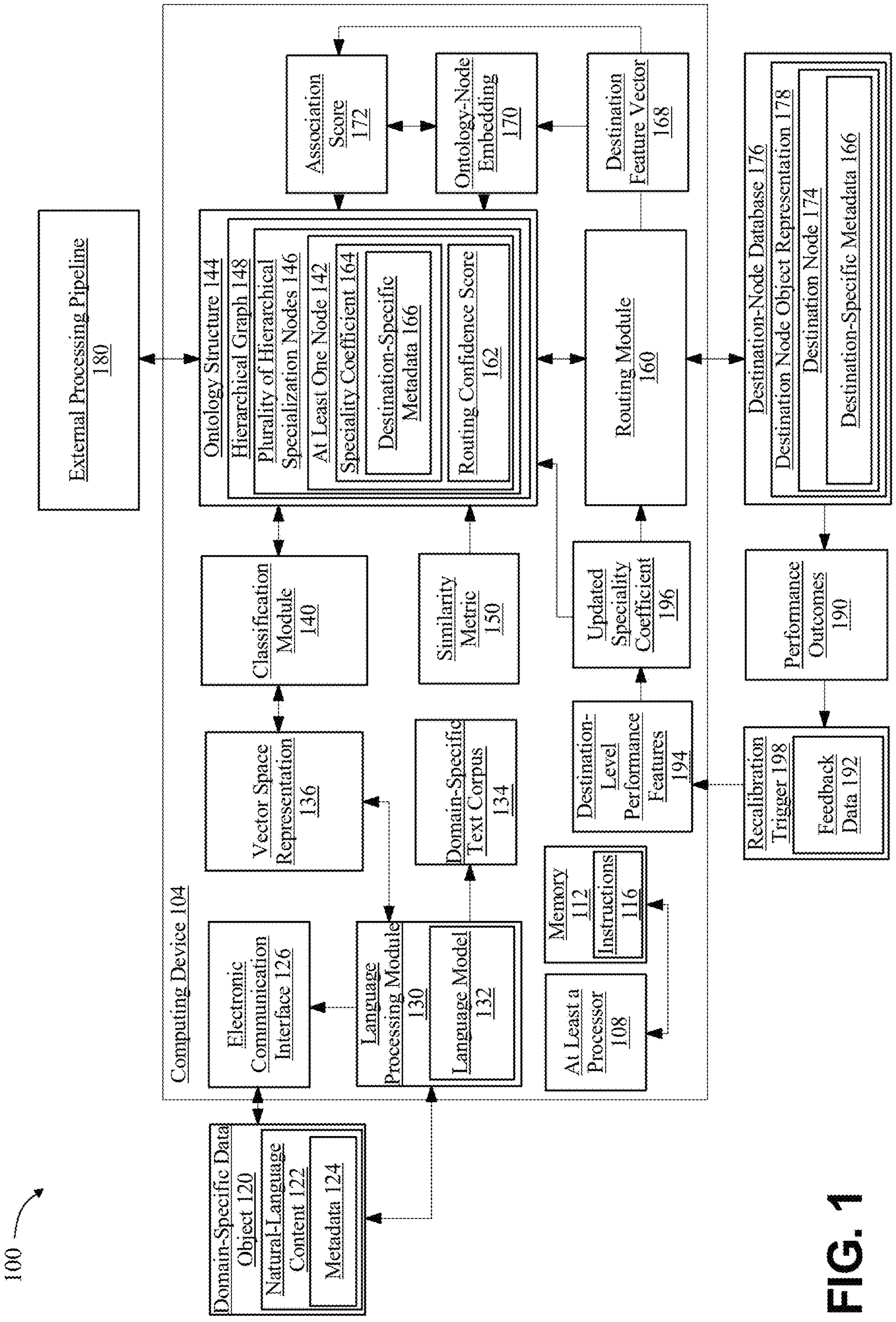
FIG. 1 is a block diagram of an exemplary system for natural language classification and adaptive routing of domain-specific data objects.

Referring now to FIG. 1, an exemplary embodiment of system 100 for natural language classification and adaptive routing of domain-specific data objects is illustrated. System 100 may include circuitry such as without limitation at least a processor 108 communicatively connected to a memory 112 containing instructions 116 configuring at least a processor 108 to initiate one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In continued reference to FIG. 1, in an embodiment, at least a processor 108 may be configured to receive a domain-specific data object 120 including natural-language content 122 and associated metadata 124. For purposes of this disclosure, a "domain-specific data object" is a structured digital entity containing information originating from a defined subject-matter or operational domain. In an embodiment, the domain-specific data object 120 may provide a standardized representation of mixed-format information (e.g., text, structured fields, or embedded attributes) that enables machine-level parsing and classification. In an embodiment, a domain-specific data object 120 may include a referral description describing a potential case along with structured attributes such as jurisdiction, case type, and submission timestamp. In other contexts, such as healthcare or logistics, the domain-specific data object 120 may include clinical notes or shipment instructions along with structured identifiers (e.g., ICD codes, tracking numbers, or priority levels). For purposes of this disclosure, "natural-language content" is linguistic data captured in human-readable form. In an embodiment, such content may include textual narratives, user-entered descriptions, transcribed audio inputs, and/or extracted document segments. The natural-language content 122 may provide the semantic input that the language-processing module subsequently projects into a vector space representation 136 for classification and routing. For purposes of this disclosure, "metadata" are structured attributes that describe properties of the domain-specific data object 120, its origin, or its contextual state. In an embodiment, metadata 124 may provide non-linguistic features that complement the semantic features extracted from the natural-language content 122. In an embodiment, metadata 124 may include source identifiers (e.g., referring user ID or API key), timestamps, categorical tags, jurisdiction codes, and/or prior routing outcomes. In an embodiment, metadata 124 may also include derived attributes such as confidence levels, event logs, and/or document classifications appended by upstream systems.

In further reference to FIG. 1, in an embodiment, receiving the domain-specific data object 120 may include receiving the domain-specific data object 120 at an electronic communication interface 126. For purposes of this disclosure, an "electronic communication interface" is a hardware and/or software layer configured to facilitate data exchange between the system and one or more external or remote sources through a defined digital communication protocol. In an embodiment, the electronic communication interface 126 may serve as the ingress point for domain-specific data objects 120 entering the system's processing environment and may support both synchronous and asynchronous transmission modalities. In one embodiment, the electronic communication interface 126 may include a network-accessible application programming interface (API) configured to receive serialized data payloads using standard transport protocols such as HTTPS or gRPC. In another embodiment, the electronic communication interface 126 may include a message broker or event-streaming interface, such as Apache Kafka, RabbitMQ, or AWS Kinesis, which may support real-time ingestion of event-driven data objects from distributed systems. In yet another embodiment, the electronic communication interface 126 may include a socket- or queue-based connection, such as a WebSocket, TCP/IP socket, or message queue interface, configured to support persistent or low-latency connections between upstream systems and the receiving processor. In an embodiment, the electronic communication interface 126 may function as the boundary layer between external data sources (e.g., client applications, partner databases, and/or case management systems) and the internal processing modules (e.g., the language-processing module 130 and classification module 140). The electronic communication interface 126 may enable system 100 to ingest heterogeneous data in a consistent and secure manner while maintaining schema compatibility and transmission integrity. The communication interface may also handle authentication, encryption, and error-handling routines to ensure that only verified and intact data objects enter the classification pipeline.

With continued reference to FIG. 1, in an embodiment, the process of receiving the domain-specific data object 120 at the electronic communication interface 126 may occur in several ways. In one implementation, system 100 may expose a RESTful API endpoint that accepts POST requests containing serialized domain-specific data objects 120 represented in JavaScript Object Notation (JSON) or Extensible Markup Language (XML). In an embodiment, the incoming request may be parsed by a network controller executing on at least a processor 108, which may extract the natural-language content 122 and metadata 124 for further processing. In another implementation, the electronic communication interface 126 may subscribe to one or more message topics in a publish-subscribe model, enabling at least a processor 108 to receive streaming domain-specific data objects 120 as soon as they are published by external systems. In still another embodiment, the electronic communication interface 126 may utilize a secure file transfer or socket listener that monitors a defined network port or directory path, automatically ingesting any detected domain-specific data object 120 for processing. Each of these implementations may ensure reliable transmission of domain-specific data into system 100, allowing subsequent modules to perform projection, classification, and adaptive routing operations with minimal latency and high data fidelity.

With further reference to FIG. 1, in an embodiment, at least a processor 108 may be configured to map, using a language processing module 130, the domain-specific data object 120 into a vector space representation 136. For purposes of this disclosure, a "language processing module" is a computational subsystem configured to perform natural language understanding, feature extraction, and semantic encoding of textual or linguistic input. In an embodiment, the language processing module 130 may include one or more trained language models 132, tokenizers, embedding generators, and/or encoder-decoder architectures that convert unstructured natural-language content 122 into structured numerical representations suitable for downstream machine-learning operations. In one embodiment, the language processing module 130 may include a transformer-based encoder, such as a BERT, ROBERTa, or GPT-style model, configured to produce contextual embeddings for each token or sentence of the natural-language content 122. In another embodiment, the language processing module 130 may employ a recurrent neural network (RNN) or long short-term memory (LSTM) encoder trained on sequential domain data. In yet another embodiment, a convolutional neural network (CNN) or hybrid architecture may be used to extract higher-order semantic features from dense textual inputs.

In continued reference to FIG. 1, in an embodiment, for purposes of this disclosure, a "vector space representation" is a numerical encoding of the semantic and contextual features of the domain-specific data object 120 expressed in an n-dimensional feature space. In an embodiment, each dimension of the vector may correspond to a latent feature learned by a language model 132 of the language processing module 130, enabling system 100 to represent semantic similarity and hierarchical relationships as mathematical distances or orientations within that space. In an embodiment, the vector space representation 136 may be a 768-dimensional embedding generated by a transformer model's final hidden layer, where semantically similar text inputs (e.g., "trucking accident" and "commercial vehicle collision") are mapped to nearby points in the vector space. In another embodiment, the vector space representation 136 may include concatenated embeddings derived from both natural-language content 122 and structured metadata 124, allowing multimodal fusion of textual and contextual features.

Still referring to FIG. 1, in an embodiment, the language processing module 130 may serve as the translation layer between human-readable input and machine-level inference. In an embodiment, the resulting vector space representation 136 may provide the mathematical basis upon which the classification module 140 can identify relationships between the input object and the hierarchical specialization nodes defined in the system's classification graph. This transformation may allow system 100 to apply similarity metrics, distance calculations, and/or learned projection functions to classify domain-specific data objects 120 with high contextual fidelity. In an embodiment, the process of mapping the domain-specific data object 120 into the vector space representation 136 may be accomplished through multiple implementations. In one embodiment, the language processing module 130 may first apply text preprocessing operations such as tokenization, normalization, stop-word removal, and part-of-speech tagging, producing an intermediate token sequence. The token sequence may then be passed through a neural encoder configured to generate dense embedding vectors that capture both local and global linguistic dependencies. In another embodiment, at least a processor 108 may employ a pretrained language model 132 fine-tuned on domain-specific text corpora to produce contextualized embeddings that are sensitive to specialized terminology or phraseology. In still another embodiment, the mapping process may include concatenating textual embeddings with feature vectors derived from metadata fields, thereby generating a composite vector representation that integrates both semantic and contextual signals. In each implementation, the result is a machine-readable feature vector that may enable efficient similarity computation and subsequent classification by the system's downstream modules.

In further reference to FIG. 1, in an embodiment, language processing module 130 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 130 may operate to produce a language processing model. Language processing model may include a program automatically generated by computing device and/or language processing module 130 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module 130 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 130 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively, or additionally, and with continued reference to FIG. 1, language processing module 130 may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. Training datasets for the large language model may include large-scale collections of textual data derived from diverse digital sources. For example, training corpora may include domain-general text such as technical manuals, academic literature, and/or knowledge-base articles; and domain-specific text such as legal case descriptions, medical procedure summaries, and/or technical support transcripts. In certain embodiments, training datasets may further incorporate structured or semi-structured content, including database records, annotated documents, and electronic records associated with labeled domain outcomes. In some implementations, subsets of the training corpus may be drawn from both public and private data repositories, with domain-specific data curated or filtered to align with the system's operational environment. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive a sequence of tokens representing an input sentence and apply a probability distribution over possible next tokens based on contextual relationships learned during pretraining. Rather than performing text completion, the LLM implemented within the language processing module 130 may utilize these probabilistic relationships to generate contextual embeddings that encode domain-relevant semantics. For example, when processing a phrase such as "commercial vehicle collision with injury," the model may identify that terms like "collision," "vehicle," and "injury" frequently co-occur in contexts relating to "trucking litigation" or "personal injury," thereby producing an embedding that positions the input near those specialization regions in the vector space. Similarly, a phrase such as "breach of fiduciary duty" may be mapped to a region associated with "corporate law" or "professional liability." In each instance, the model may apply learned probability distributions and self-attention mechanisms to assign higher contextual relevance to domain-specific terms, enabling system 100 to produce embeddings that reflect semantic proximity to hierarchical specialization nodes within the classification graph. An LLM suitable for use in this context may include an encoder component and a decoder component. In an embodiment, the encoder component may capture bidirectional contextual dependencies between tokens, while the decoder component may reconstruct or refine embeddings based on learned attention weights. Together, these components may enable the language processing module 130 to convert natural-language content 122 from the domain-specific data object 120 into structured vector representations that preserve both semantic and hierarchical relationships necessary for downstream classification and routing.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An “attention mechanism,” as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A “context vector,” as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, when processing a phrase such as “commercial vehicle collision with multiple injuries,” the LLM may learn to associate the token “collision” with semantically related tokens such as “vehicle,” “injuries,” and “liability.” Over successive training iterations, the model may also infer that word patterns appearing in this configuration are statistically correlated with concepts such as “trucking litigation” or “personal injury claims” within the system's classification graph. In another example, the model may learn that the co-occurrence of “breach,” “fiduciary,” and “obligation” corresponds to contexts typically associated with “corporate law” or “professional misconduct.” These associations may enable the encoder to generate embeddings that reflect domain-specific meaning rather than surface-level word proximity. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a “head.” Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include a free-text narrative such as "client injured in a commercial trucking collision," a query string such as "medical malpractice attorney in Boston," and/or a structured text segment embedded within a JSON payload containing fields for "case type," "jurisdiction," and "submission date." Each such input may be received at the electronic communication interface 126 of system 100 and transformed by the language processing module 130 into a vector space representation 136 for classification within the hierarchical specialization graph.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 130 may use a corpus of documents to generate associations between language elements in a language processing module 130, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in an embodiment, the language processing module 130 may include a language model 132 that has been trained on a domain-specific text corpus 134. For purposes of this disclosure, a "language model" is a computational model trained to learn probabilistic or contextual relationships between tokens, words, or sequences of text, enabling the conversion of natural-language content 122 into numerical or symbolic representations that preserve semantic meaning. In an embodiment, a language model 132 may include one or more neural network architectures, embedding layers, and/or probabilistic encoders that infer syntactic and semantic relationships between linguistic units. In one embodiment, the language model 132 may include a transformer-based encoder-decoder architecture such as BERT, ROBERTa, or T5, configured to learn bidirectional contextual dependencies from tokenized text. In another embodiment, the language model 132 may include a recurrent neural network (RNN) or long short-term memory (LSTM) structure optimized for sequential text analysis. In yet another embodiment, the language model 132 may employ a hybrid framework combining convolutional filters for local feature extraction with attention mechanisms for global context modeling.

With further reference to FIG. 1, for purposes of this disclosure, a "domain-specific text corpus" is a curated or collected body of textual data that reflects the linguistic structure, terminology, and contextual features of a particular subject-matter domain. In an embodiment, the domain-specific text corpus 134 may provide representative examples of the language and concepts encountered during system operation, enabling the language model 132 to learn contextual patterns unique to that domain. In an embodiment, the domain-specific text corpus 134 may include historical case descriptions, referral narratives, and/or legal pleadings annotated with corresponding practice areas or outcomes. In a medical-domain embodiment, the corpus may consist of clinical notes, procedural summaries, and/or medical abstracts labeled by diagnostic category or anatomical focus. In other embodiments, the domain-specific text corpus 134 may include technical manuals, support transcripts, and/or industry-specific reports that reflect the vocabulary and context of the intended operational environment. In an embodiment, the language model 132 trained on the domain-specific text corpus 134 may enable the language processing module 130 to encode incoming natural-language content 122 in a manner that reflects not only general linguistic structure but also domain-relevant semantics. This may improve the accuracy of downstream classification and routing by ensuring that contextually similar inputs produce nearby embeddings in the vector space. For example, in a legal-routing embodiment, the language model 132 may learn to associate the term "motor carrier liability" with the concept of "trucking litigation," while distinguishing it from superficially similar but contextually distinct terms such as "automobile insurance dispute."

In further reference to FIG. 1, in an embodiment, training of the language model 132 on the domain-specific text corpus 134 may be accomplished in several technical ways. In one embodiment, a pretrained general-purpose model (e.g., BERT or GPT) may undergo fine-tuning on the domain-specific text corpus 134 using supervised learning, where domain labels or annotations guide model weight adjustments. In another embodiment, an unsupervised training pipeline may employ masked language modeling (MLM) or next-token prediction objectives applied exclusively to domain text, allowing the language model 132 to learn contextual dependencies without explicit labeling. In yet another embodiment, at least a processor 108 may periodically retrain or adapt the language model 132 using incremental learning techniques that integrate newly ingested text data into the corpus to capture evolving terminology or usage patterns. In an embodiment, each implementation may enable system 100 to maintain a language model 132 whose learned parameters are specialized for its target domain, thereby improving the precision of semantic mapping and routing across diverse and evolving data environments.

In continued reference to FIG. 1, in an embodiment, mapping the domain-specific data object 120 into the vector space representation 136 may include encoding the natural-language content 122 of the domain-specific data object 120 using the language model 132. For purposes of this disclosure, "encoding" refers to a computational transformation in which textual or linguistic input is converted into a structured numerical representation that captures semantic, syntactic, and contextual features of the original language. In an embodiment, encoding may involve one or more intermediate operations, including tokenization, embedding generation, and contextualization, resulting in a fixed-length or variable-length numerical vector that preserves relationships between tokens in a high-dimensional feature space. In one embodiment, the encoding operation may tokenize an input text sequence (e.g., "multi-vehicle collision on interstate") into discrete tokens ("multi," "vehicle," "collision," "on," "interstate"), each of which may be mapped to a dense embedding vector. In another embodiment, the encoding may incorporate subword units or byte-pair encodings (BPEs) to efficiently represent rare or compound words (e.g., "motor-carrier" to "motor"+"6carrier"). In yet another embodiment, the encoder may generate contextual embeddings such that the representation of each token dynamically reflects its meaning relative to neighboring tokens, allowing the same word (e.g., "appeal") to produce different embeddings in "appeal case" versus "appeal for leniency."

Still referring to FIG. 1, in an embodiment, encoding may represent the core transformation stage that bridges raw natural-language input and downstream machine-learning operations. In an embodiment, the encoded vector space representation 136 produced by the language model 132 may serve as the standardized input to the classification module 140, enabling numerical comparison, similarity scoring, and hierarchical mapping to nodes of the system's classification graph. By encoding each domain-specific data object 120 into a consistent numerical feature space, system 100 can efficiently process heterogeneous inputs from diverse sources without the need for handcrafted rules or keyword heuristics. In an embodiment, encoding natural-language content 122 may be accomplished through several implementations. In one embodiment, at least a processor 108 may execute a transformer-based encoder that computes self-attention matrices over the token sequence, combining token embeddings according to learned attention weights to generate a contextually informed vector. In another embodiment, the language model 132 may employ a recurrent architecture (e.g., bidirectional LSTM) that processes text sequentially, updating hidden states across time steps to produce an aggregate sentence or document embedding. In yet another embodiment, a dual-encoder framework may be used, where one encoder processes textual content and another processes metadata features, the outputs of which are concatenated or fused using a projection layer to produce a composite vector representation. In some implementations, dimensionality reduction techniques such as principal component analysis (PCA) or trainable projection layers may be applied to constrain embedding dimensionality while preserving semantic variance. Each of these approaches may result in an encoded vector representation that captures the linguistic and contextual semantics of the input, enabling high-fidelity classification and adaptive routing in subsequent stages of the system.

Still referring to FIG. 1, in an embodiment, at least a processor 108 may be configured to classify, using a classification module 140, the vector space representation 136 to at least one node 142 of an ontology structure 144, wherein the ontology structure 144 defines a plurality of hierarchical specialization nodes 146. For purposes of this disclosure, a "classification module" is a computational subsystem configured to assign or map encoded feature representations to one or more defined categories, classes, or nodes within a structured knowledge representation. In an embodiment, the classification module 140 may include one or more machine-learning models, rule-based systems, and/or similarity-based algorithms configured to determine the semantic proximity between the input representation and reference embeddings or classification boundaries associated with nodes of the ontology structure 144. In one embodiment, the classification module 140 may include a supervised neural classifier trained on historical case data to output probabilities across a fixed set of specialization categories. In another embodiment, the classification module 140 may employ a similarity engine that computes cosine similarity or dot-product measures between the input vector and stored node embeddings, selecting the node or nodes with the highest similarity scores. In yet another embodiment, the classification module 140 may use a hybrid approach, combining a trained softmax classifier with graph-based reasoning to refine node assignment based on hierarchical relationships.

In further reference to FIG. 1, in an embodiment, the classification module 140 may be trained using a dataset including annotated or inferred associations between domain-specific data objects 120 and corresponding nodes of the ontology structure 144. For purposes of this disclosure, "training data" refers to a structured or semi-structured collection of examples that pair textual inputs with target labels. In some embodiments, training data may be curated from historical case routing logs, manually reviewed case descriptions, and/or prior system classifications verified through human feedback. In an embodiment, the training data may include both unstructured natural-language text and structured metadata fields such as practice area, jurisdiction, case outcome, or firm specialization indicators. In one embodiment, the training process may employ a supervised learning approach in which a neural network classifier is optimized to minimize a loss function (e.g., categorical cross-entropy) between predicted and true node labels. In another embodiment, semi-supervised or self-supervised techniques may be used, wherein unlabeled data objects are embedded into the same vector space as labeled examples, and the model learns to cluster or align similar embeddings using contrastive loss functions or pseudo-labeling mechanisms. In further embodiments, the classification module 140 may be fine-tuned on domain-specific corpora using transfer learning, wherein a pre-trained base model (e.g., a transformer encoder trained on general legal text) is adapted to the ontology-specific classification task. During training, system 100 may iteratively update model parameters such as attention weights, layer normalization coefficients, and embedding projection matrices to improve the alignment between the latent semantic space and the hierarchical relationships defined in the ontology. In an embodiment, training may occur offline during initial model development and/or continuously through online learning pipelines that integrate real-time performance outcomes 190 from the routing module 160. Over time, the classification module 140 may evolve to more accurately associate input vector representations with the most semantically relevant specialization nodes, reducing misclassification and improving downstream routing precision.

With continued reference to FIG. 1, for purposes of this disclosure, an "ontology structure" is a representation of domain knowledge that organizes concepts, entities, and their interrelationships in a structured and hierarchical manner. In an embodiment, the ontology structure 144 may serve as the semantic framework against which incoming vector representations are classified. In an embodiment, the ontology structure 144 may be implemented as a graph, tree, and/or relational schema where nodes represent domain concepts, edges represent relationships, and associated embeddings capture contextual similarity between nodes. In an embodiment, the ontology structure 144 may represent the domain of legal practice, with primary branches for "Civil Litigation," "Criminal Defense," "Corporate Law," and "Family Law." Each branch may contain subcategories such as "Trucking Litigation," "Medical Malpractice," "Contract Dispute," or "Divorce Proceedings." In another embodiment, a healthcare ontology may include hierarchical groupings such as "Cardiology," "Orthopedics," and "Neurology," each with nested procedural or diagnostic nodes.

In continued reference to FIG. 1, for purposes of this disclosure, a "node" is a discrete representational element within the ontology structure 144 corresponding to a specific category, entity, or conceptual feature. In an embodiment, each node may be defined by a set of attributes, including a node identifier, label, embedding vector, and/or references to parent and child nodes. The at least a node may act as an addressable unit of classification that allows system 100 to organize, traverse, and retrieve information based on hierarchical and semantic relationships. For purposes of this disclosure, "hierarchical specialization nodes" are nodes arranged in a parent-child hierarchy that captures increasing levels of specificity within the ontology structure 144. In an embodiment, a parent node may represent a broad category or field, while a child node may represent a narrower subdomain, specialization, or context-dependent classification. For example, a hierarchical specialization node structure may include a parent node "Personal Injury," with child nodes "Motor Vehicle Accidents," "Trucking Collisions," and "Workplace Injury." Within "Trucking Collisions," additional nested nodes may represent subcategories such as "Commercial Carrier Liability" or "Hazardous Materials Transport." These hierarchical relationships may allow the classification module 140 to propagate semantic relevance across multiple levels of abstraction, enabling both coarse-grained and fine-grained classification.

Still referring to FIG. 1, in an embodiment, the classification module 140 may function as the decision-making layer that transforms the continuous vector space representation 136 into a discrete or probabilistic mapping within the ontology structure 144. In an embodiment, the classification output may include one or more node identifiers and/or corresponding confidence values representing the system's assessment of relevance. This classification process may be implemented in multiple ways. In one embodiment, at least a processor 108 may execute a feed-forward neural classifier trained using cross-entropy loss to output probability distributions across the ontology nodes. In another embodiment, the classification module 140 may perform graph traversal, comparing the vector space representation 136 against stored node embeddings using a similarity metric 150 such as cosine similarity, and propagating scores through the ontology hierarchy to determine the most relevant path. In yet another embodiment, classification may involve hierarchical softmax or multi-label prediction, allowing a single input to be associated with multiple specialization nodes at different levels of the hierarchy. In each case, the ontology structure 144 may provide a semantic scaffold that enables system 100 to interpret and organize domain-specific data objects 120 according to their conceptual relationships, improving classification accuracy and contextual relevance across the routing pipeline.

In further reference to FIG. 1, in an embodiment, the ontology structure 144 may include a hierarchal graph defining the plurality of hierarchical specialization nodes 146. For purposes of this disclosure, a "hierarchical graph" is a structured data representation that organizes entities or concepts into interconnected nodes and edges. In an embodiment, parent-child relationships of the hierarchical graph 148 may reflect increasing levels of specificity or dependency within a given domain. Unlike a simple tree structure, a hierarchical graph 148 may permit cross-links and/or weighted relationships between nodes at different levels, enabling the representation of both vertical hierarchies (e.g., category-subcategory relationships) and horizontal associations (e.g., conceptual overlaps or co-classifications). In some embodiments, each node of the hierarchical graph 148 may correspond to a distinct specialization or sub-specialization within the system's domain ontology, such as "Personal Injury," "Trucking Litigation," or "Medical Malpractice," while each edge may encode a semantic relationship between those nodes, such as "is a subcategory of," "is related to," or "shares client attributes with." In an embodiment, the hierarchical graph 148 may be implemented as a directed acyclic graph (DAG) to preserve hierarchical order while allowing multiple parent nodes, or as a weighted adjacency matrix where edge weights represent degrees of semantic similarity or practice overlap. In an embodiment, the hierarchical graph 148 may be stored in a graph database or memory-resident data structure optimized for traversal and lookup operations, such as Neo4j, TigerGraph, or a custom-built knowledge graph engine. In an embodiment, each node may include attributes such as a node identifier, textual descriptor, embedding vector, and/or confidence score, while each edge may store relational metadata 124 such as connection type, hierarchical depth, or historical co-occurrence frequency between nodes. In an embodiment, the hierarchical graph 148 may provide the structural backbone that enables the classification module 140 to interpret the semantic relationships among specialization nodes. When a new vector space representation 136 is generated by the language processing module 130, the hierarchical graph 148 may allow system 100 to locate the most relevant specialization node(s) not merely through surface similarity, but by considering the hierarchical and relational proximity of the input vector to both parent and child categories. In an embodiment, this structure may support fine-grained classification while preserving contextual awareness across related practice areas, improving the accuracy and explainability of the routing process.

With further reference to FIG. 1, in an embodiment, classifying the vector space representation 136 to at least one node 142 of the ontology structure 144 may include mapping the vector space representation 136 to one or more hierarchical specialization nodes of the plurality of hierarchical specialization nodes 146 as a function of a similarity metric 150. For purposes of this disclosure, a "similarity metric" is a quantitative function that measures the degree of closeness, alignment, or relatedness between two numerical representations. In an embodiment, the similarity metric 150 may output a scalar value that represents how closely the semantic or contextual meaning of the input aligns with that of the target node. In one embodiment, the similarity metric 150 may include cosine similarity, which measures the cosine of the angle between two normalized vectors in multidimensional space. In another embodiment, the similarity metric 150 may include dot-product similarity, Euclidean distance, or Mahalanobis distance, depending on whether angular alignment or magnitude differences are more relevant to the classification objective. In further embodiments, the similarity metric 150 may include learned similarity functions, such as neural similarity models that use attention-weighted layers to estimate pairwise closeness between embeddings based on domain-specific relationships. In an embodiment, the similarity metric 150 may operate as the computational basis for mapping each new vector space representation 136 to its most semantically relevant node(s). The classification module 140 may compute similarity scores between the input vector and stored node embeddings across all or a subset of nodes in the ontology structure 144. In an embodiment, these similarity scores may then be ranked, thresholded, and/or normalized to produce a list of candidate hierarchical specialization nodes with corresponding confidence values. The top-ranked node or set of nodes may be selected as the classification output, which may be subsequently passed to the routing module 160 for destination selection.

Still referring to FIG. 1, in an embodiment, similarity calculation may occur within a vector index or embedding retrieval engine optimized for high-dimensional search, such as a FAISS (Facebook AI Similarity Search) index, an approximate nearest-neighbor (ANN) search, or a transformer-based attention layer. In an embodiment, system 100 may additionally employ adaptive thresholding logic, wherein the minimum similarity required for classification dynamically adjusts based on node density, hierarchical depth, and/or prior routing accuracy. In another embodiment, the similarity metric 150 may be augmented by hierarchical weighting factors, such that proximity to a child node is influenced by the relevance of its parent node, ensuring that classification decisions remain consistent with the structural dependencies defined in the ontology. In this manner, the similarity metric 150 may allow system 100 to translate the abstract numerical geometry of the vector space representation 136 into discrete, semantically interpretable node assignments. This process may ensure that each domain-specific data object 120 is accurately positioned within the ontology hierarchy, facilitating downstream operations such as specialty-weighted routing and performance-driven recalibration of classification boundaries.

With continued reference to FIG. 1, in an embodiment, at least a processor 108 may be configured to generate, using a routing module 160, a routing confidence score 162 as a function of a specialty coefficient 164 associated with the at least one node 142 of the ontology structure 144, wherein the specialty coefficient 164 is derived from destination-specific metadata 166. For purposes of this disclosure, a "routing module" is a computational subsystem configured to determine, rank, and assign an optimal destination node 174 for a given classified input based on quantitative and contextual indicators of relevance. In an embodiment, the routing module 160 may receive as input one or more hierarchical specialization nodes output by the classification module 140, along with associated confidence values, and may combine these with metadata about potential destination nodes 174, such as firm profiles, practice records, or resource availability, to generate routing decisions. In an embodiment, the routing module 160 may include one or more subcomponents, such as a scoring engine, a weighting calculator, and a normalization routine, that collectively compute routing confidence scores 162 for a plurality of potential destinations.

In continued reference to FIG. 1, for purposes of this disclosure, a "routing confidence score" is a numerical value representing the computed likelihood or degree of appropriateness that a particular destination node 174 corresponds to the classified domain-specific data object 120. In an embodiment, the routing confidence score 162 may be expressed as a scalar value, probability, and/or normalized weight. In an embodiment, the routing confidence sore may be calculated as a function of one or more specialty coefficients 164, classification confidence levels, and/or destination-level metadata features. In some embodiments, routing confidence scores 162 may be computed for multiple candidate destinations and ranked to determine the most suitable destination node 174. For purposes of this disclosure, a "specialty coefficient" is a quantitative value representing the degree of expertise, specialization, or suitability of a given destination with respect to a specific node or branch within the ontology structure 144. The specialty coefficient 164 may be derived from historical performance data, case outcomes, and/or model-inferred associations between destination features and ontology nodes. In one embodiment, specialty coefficients 164 may be precomputed and stored as node-destination pair weights that are periodically recalibrated based on performance outcomes 190. In another embodiment, specialty coefficients 164 may be dynamically generated by the routing module 160 using a regression or neural scoring model that analyzes recent metadata 124 streams to infer real-time expertise strength.

With further reference to FIG. 1, for purposes of this disclosure, "destination-specific metadata" refers to structured or semi-structured data that characterizes a particular destination node 174, entity, or endpoint within the routing network. In an embodiment, such metadata may include, without limitation, firm size, geographic location, case acceptance history, outcome statistics, specialization tags, and/or client satisfaction metrics. In some embodiments, destination-specific metadata 166 may also include latent features generated from system logs, user behavior analytics, and/or prior routing decisions. Each destination node 174 may maintain an associated metadata 124 profile stored in a destination-node database 176, which may be accessible by the routing module 160 during confidence score generation. In an embodiment, at least a processor 108 may compute a routing confidence score 162 for each potential destination node 174 by evaluating a weighted similarity function between (i) the classification output vector and (ii) the destination's specialty coefficient 164 vector derived from its metadata 124. In an embodiment, system 100 may normalize these results using a softmax or min-max scaling function to produce confidence scores that sum to one across all candidate destinations. The routing module 160 may then select the destination node 174 with the highest routing confidence score 162 or may output a ranked list of candidates for downstream verification or ensemble routing. In another embodiment, the routing module 160 may implement a machine-learning model, such as a gradient-boosted decision tree, logistic regression, or neural network, that takes as input the concatenation of classification features, specialty coefficients 164, and destination-specific metadata vectors. The model may output a predicted routing confidence score 162 representing the probability that the corresponding destination will produce a successful outcome for the given data object. This computed score may enable adaptive and data-driven routing decisions, ensuring that referrals are directed to destinations with the highest demonstrated or inferred expertise for the classified specialization.

With continued reference to FIG. 1, in an embodiment, the machine-learning model within the routing module 160 may be trained using a dataset comprising historical routing records, classification outputs, and corresponding performance outcomes 190. In an embodiment, each training instance may include, without limitation: (i) the vector space representation 136 of the input data object; (ii) the node or nodes of the ontology structure 144 to which the data object was classified; (iii) destination-specific metadata 166 corresponding to the destination node 174 selected for routing; and (iv) a set of outcome features representing the success or quality of the referral. Outcome features may include binary success indicators, resolution time, client satisfaction ratings, and/or performance metrics derived from case management systems. In one embodiment, the machine-learning model may be trained in a supervised learning framework to predict the likelihood of a successful outcome for a given pairing of an input representation and a destination node 174. The training objective may involve minimizing a loss function, such as mean squared error or binary cross-entropy, between predicted routing confidence scores 162 and empirical outcome values observed in historical data. In another embodiment, the model may employ a reinforcement learning or online learning approach, where feedback from real-time routing results is continuously incorporated to update model parameters, thereby improving accuracy over time. In some embodiments, the training dataset may be augmented with synthetic or extrapolated samples to improve coverage across underrepresented specializations or geographic regions. In an embodiment, feature engineering may include generating derived indicators, such as aggregated outcome statistics per specialization node, temporal decay factors for outdated results, and interaction terms between metadata attributes (e.g., firm size×case complexity). The model may further incorporate regularization and cross-validation techniques to prevent overfitting, ensuring that the routing confidence scores 162 generalize across unseen data. In an embodiment, through this training process, the routing module 160 may become capable of generating specialty coefficients 164 and routing confidence scores 162 that dynamically reflect the evolving performance and specialization landscape of the destination network.

Still referring to FIG. 1, in an embodiment, at least a processor 108 may be configured to calculate, using the routing module 160, the specialty coefficient 164. In an embodiment, the specialty coefficient 164 may act as a learned or computed weight that modulates the routing confidence score 162 generated by the routing module 160. In some cases, the specialty coefficient 164 may capture how strongly a particular destination node 174, such as a firm, department, or expert entity, is associated with a given specialization or ontology node based on empirical performance, resource attributes, and learned semantic relationships. In an embodiment, specialty coefficients 164 may be stored as a destination-specialization matrix in which each row represents a destination node 174 and each column represents an ontology node. In an embodiment, each cell of the matrix may contain a numeric weight that quantifies the historical or inferred strength of association between that destination and that specialization. These weights may be static, periodically updated, and/or dynamically recalculated in real time as new metadata and outcomes are received by the routing module 160.

In further reference to FIG. 1, in some implementations, specialty coefficients 164 may be learned directly by a machine-learning model, while in others they may be computed algorithmically using similarity measures between destination feature vectors 168 and ontology-node embeddings 170. In some implementations, specialty coefficients 164 may be learned directly by a machine-learning model trained to infer destination expertise patterns from empirical data. In an embodiment, the model may take as input destination-specific metadata 166 and ontology-node embeddings 170 and output predicted coefficients representing inferred degrees of alignment. For example, a neural regression model may minimize a loss function between predicted coefficients and ground-truth outcomes such as successful referral frequency, client satisfaction, or historical case fit. Over successive training epochs, the model may learn latent patterns that encode relationships between domain specialization and real-world destination performance, thereby producing continuously optimized specialty coefficients 164. Alternatively, specialty coefficients 164 may be computed algorithmically using one or more similarity functions that operate on pre-encoded representations. In one embodiment, at least a processor may calculate a cosine similarity or dot-product similarity between each destination's feature vector and the embedding vector corresponding to an ontology node. The resulting scalar values may be normalized to produce a coefficient distribution that reflects the comparative expertise of all destinations for a given specialization. In another embodiment, coefficients may be derived through Bayesian updating or reinforcement learning, wherein prior coefficient values are iteratively adjusted as new outcome data are observed, enabling the model to self-calibrate over time without full retraining. In yet another embodiment, a hybrid computation approach may be employed. In an embodiment, system 100 may initialize specialty coefficients 164 using historical averages or similarity-based estimations, then refine those coefficients through periodic machine-learning updates as additional routing and performance data become available. This hybrid approach may allow the routing module 160 to combine the transparency of deterministic similarity measures with the adaptability of data-driven model learning. In an embodiment, the result may be a continuously evolving network of specialty coefficients 164 that reflect both the semantic structure of the ontology and the dynamic performance characteristics of destinations within the routing ecosystem.

In continued reference to FIG. 1, in an embodiment, calculating the specialty coefficient 164 may include retrieving destination-specific metadata 166 for a plurality of destination nodes 174 as a function of the at least one node 142 of the ontology structure 144. For purposes of this disclosure, a "destination node" is a discrete data entity within the routing network that represents a selectable endpoint, organization, or individual capable of receiving or handling a classified data object. In an embodiment, each destination node 174 may correspond, as non-limiting examples, to a law firm, practice group, attorney, consultant, service provider, and/or other domain-specific recipient within the system. In some embodiments, a destination node 174 may also represent an aggregated routing endpoint, such as a referral network, regional office, or category of service providers, depending on the level of abstraction employed in the ontology structure 144. In an embodiment, each destination node 174 may include a unique identifier, destination profile, and a set of associated metadata fields used by the routing module 160 to evaluate suitability and compute the specialty coefficient 164.

Still referring to FIG. 1, in an embodiment, retrieving destination-specific metadata 166 may involve querying a destination-node database 176 or equivalent data repository that stores structured representations of each destination node 174. In an embodiment, this database may include attributes such as geographic coverage, specialization tags, case acceptance capacity, response time, client satisfaction metrics, and/or success rates for specific ontology nodes. In one embodiment, at least a processor 108 may execute a parameterized query that filters destination records according to their hierarchical relationship to the active ontology node. For example, when the classified input maps to the ontology node "Trucking Litigation," the retrieval process may prioritize destinations historically linked to "Personal Injury" or "Commercial Vehicle Accidents" nodes. In another embodiment, metadata retrieval may employ a weighted filtering approach, wherein destinations are assigned preliminary relevance scores based on proximity to the classified specialization node in the ontology graph. In an embodiment, the routing module 160 may then retrieve only those destinations whose relationship scores exceed a threshold, reducing computational load while preserving relevance. Metadata may be retrieved using a network-accessible API, synchronized data feed, or in-memory cache depending on deployment configuration. In yet another embodiment, the retrieval process may include temporal and contextual constraints. In an embodiment, the routing module 160 may prioritize recent metadata entries or restrict retrieval to destinations with updated performance metrics within a defined time window. Similarly, contextual parameters such as jurisdiction, case type, or data-object attributes (e.g., language, client region) may be used as query filters. This may ensure that the specialty coefficient 164 is calculated using metadata that accurately reflect current operational and contextual conditions across the routing network. In an embodiment, through this metadata retrieval process, system 100 may establish the foundational dataset from which destination feature vectors 168 are subsequently generated, enabling the routing module 160 to evaluate and quantify the relationship between each destination node 174 and the ontology node of interest.

With further reference to FIG. 1, in an embodiment, calculating the specialty coefficient 164 may include encoding the destination-specific metadata 166 for each destination node 174 into a destination feature vector 168. For purposes of this disclosure, a "destination feature vector" is a structured numerical representation that encodes the characteristics, capabilities, and performance attributes of a given destination node 174 into a fixed-length vector suitable for computational comparison and machine-learning operations. In an embodiment, each destination feature vector 168 may occupy a point in an n-dimensional vector space, where each dimension corresponds to a learned or engineered feature derived from the destination's metadata profile. These features may include both explicit attributes (e.g., location, specialization type, case success rate) and latent attributes learned through model-based embedding. In an embodiment, encoding destination-specific metadata 166 may involve applying one or more feature transformation operations that convert heterogeneous data types into numerical form. In an embodiment, categorical fields such as "practice area," "region," or "case type handled" may be one-hot encoded or embedded using a pretrained text-embedding model. Further, in some cases, quantitative fields such as "average case duration," "win rate," or "case volume" may be normalized to a consistent scale, for example using min-max normalization or z-score standardization. Boolean or binary attributes (e.g., "accepts contingency cases," "specializes in commercial litigation") may be encoded as binary indicators or probability estimates.

In continued reference to FIG. 1, in some embodiments, at least a processor 108 may employ a neural embedding encoder trained to map textual metadata (e.g., firm descriptions or specialization statements) into the same vector space as ontology-node embeddings 170 generated by the language processing module 130. In an embodiment, this alignment may ensure that semantic proximity between destinations and ontology nodes can be directly evaluated using similarity functions. For example, a firm with metadata describing "defense of motor carriers in liability claims" may be encoded to a vector position that is semantically close to the ontology node "Trucking Litigation." In another embodiment, the encoding process may incorporate dimensionality reduction or feature selection techniques, such as principal component analysis (PCA), autoencoders, and/or attention-based feature weighting, to ensure that the most discriminative features dominate the destination feature vector 168. These methods may enhance computational efficiency and reduce overfitting by eliminating redundant or noisy metadata dimensions. Once generated, destination feature vectors 168 may be stored in a vector database or in-memory index accessible by the routing module 160. In an embodiment, at least a processor 108 may subsequently use these vectors in downstream calculations, such as association scoring and coefficient normalization, to quantify the degree of semantic and empirical alignment between each destination node 174 and the ontology node under evaluation. In this way, the destination feature vector 168 may function as the canonical numerical profile through which the routing module 160 compares and ranks destinations in a unified, model-consistent representation space.

Still referring to FIG. 1, in an embodiment, calculating the specialty coefficient 164 may include receiving an ontology-node embedding 170 corresponding to the at least one node 142 of the ontology structure 144. For purposes of this disclosure, an "ontology-node embedding" is a numerical representation that encodes the semantic meaning, contextual relationships, and hierarchical position of a given node within the ontology structure 144. In an embodiment, each embedding may occupy a point in a multidimensional vector space such that semantically similar nodes (e.g., "Medical Malpractice" and "Surgical Negligence") reside near each other, while dissimilar nodes (e.g., "Family Law" and "Patent Prosecution") are positioned farther apart. In an embodiment, the ontology-node embedding 170 thus may function as the quantitative anchor by which the routing module 160 evaluates alignment between an input's classified specialization and the capabilities of potential destination nodes 174. In an embodiment, ontology-node embeddings 170 may be pre-computed during system initialization or dynamically generated by the classification module 140 during runtime. In an embodiment, pre-computed embeddings may be produced using graph-based representation-learning techniques such as Node2Vec, GraphSAGE, or TransE, which learn low-dimensional embeddings from the topology of the ontology graph itself. These methods capture both local relationships (e.g., parent-child dependencies) and global structure (e.g., cross-branch correlations), ensuring that hierarchical and associative semantics are preserved in the embedding space.

With continued reference to FIG. 1, in another embodiment, ontology-node embeddings 170 may be derived from the hidden-layer activations of the language processing or classification modules 140. For instance, when the classification model predicts a specific specialization node, system 100 may extract the activation vector from the final transformer or dense layer as that node's contextual embedding. Over time, as new data are processed, these embeddings can be fine-tuned using back-propagation or contrastive learning to reflect evolving semantic boundaries between nodes. In an embodiment, each ontology-node embedding 170 may include additional metadata fields, such as a unique node identifier, hierarchical depth index, and relational adjacency list, enabling efficient lookup and traversal by the routing module 160. In some cases, embeddings may be stored in a vector index and/or memory-resident embedding store aligned with the same coordinate space as destination feature vectors 168. This shared space may allow at least a processor 108 to perform direct similarity computations, such as cosine similarity or neural attention alignment, between ontology-node embeddings 170 and destination feature vectors 168, forming the mathematical basis for computing association scores 172 and, ultimately, specialty coefficients 164. In this way, the ontology-node embedding 170 may provide the semantic fingerprint of the specialization context, enabling the routing module 160 to quantify conceptual proximity between classified inputs and destination capabilities within a unified representational framework.

In further reference to FIG. 1, in an embodiment, calculating the specialty coefficient 164 may include generating, for each destination node 174, an association score 172 between the destination feature vector 168 and the ontology-node embedding 170. For purposes of this disclosure, an "association score" is a numerical measure representing the degree of semantic and operational alignment between a destination node's encoded profile and the specialization context represented by a particular ontology node. In an embodiment, the association score 172 may serve as an intermediate computation that quantifies how closely a destination's capabilities correspond to the classification output of system 100. In an embodiment, a higher association score 172 may indicate greater contextual relevance and suitability of the destination for handling domain-specific data objects 120 mapped to that specialization. In an embodiment, the association score 172 may be computed using a similarity function that evaluates geometric or statistical proximity between the destination feature vector 168 and the ontology-node embedding 170. Non-limiting examples of similarity functions may include cosine similarity, which measures angular distance between normalized vectors; dot-product similarity, which evaluates directional correlation; and Euclidean distance, which may capture absolute separation in the vector space. In some embodiments, system 100 may employ a learned similarity model, such as a small feed-forward neural network or attention-based layer, that receives the concatenated or element-wise product of the two vectors and outputs a scalar similarity value.

In continued reference to FIG. 1, in another embodiment, the association score 172 may be derived from a bilinear mapping function of the form $$s = v_d^T W v_o$$

where $v_d$ represents the destination feature vector 168, $v_o$ represents the ontology-node embedding 170, and W is a learned weight matrix that encodes the cross-dimensional relationships between destination and ontology features. In an embodiment, this formulation may allow the model to learn non-symmetric relationships; for example, cases in which some destination attributes are more influential for certain specializations than others.

With further reference to FIG. 1, in some implementations, the routing module 160 may generate association scores 172 for all destinations simultaneously using batch-vector operations or GPU-accelerated matrix multiplication. The resulting association score 172 array may be cached or streamed to the next processing layer, where it may be normalized to produce specialty coefficients 164. In other embodiments, the routing module 160 may apply contextual weighting factors to adjust the raw association scores 172 based on external parameters such as time sensitivity, jurisdictional proximity, and/or outcome-based recency. In an embodiment, through these mechanisms, the association score 172 may function as the foundational quantitative measure from which the system derives specialty coefficients 164 and, ultimately, routing confidence scores 162. By translating high-dimensional semantic and performance relationships into scalar compatibility values, system may enable efficient and explainable determination of destination relevance across large, dynamically evolving referral networks.

With continued reference to FIG. 1, in an embodiment, calculating the specialty coefficient 164 may include generating the specialty coefficient 164 as a function of normalizing the association score 172 across the plurality of destination nodes 174. In an embodiment, normalizing the association score 172 may refer to transforming the raw or unscaled association scores 172 computed for each destination node 174 into standardized values that are directly comparable within the same numerical range. In an embodiment, this normalization process may allow the routing module 160 to evaluate destinations on a consistent basis, regardless of variations in magnitude, data density, or embedding dimensionality. The resulting normalized values, referred to as specialty coefficients 164, may represent relative probabilities and/or proportional confidence levels that a given destination node 174 is best suited for the classified specialization. In an embodiment, normalization may involve converting all association scores 172 into a common probability distribution so that the relative strength of each destination's association is preserved while the sum of all coefficients remains consistent across the network. In another embodiment, normalization may include scaling or centering the scores according to their observed range or average value, ensuring that destinations with higher association scores 172 receive proportionally greater weighting without distortion from outliers. In some embodiments, normalization may also incorporate adaptive weighting or contextual adjustments to account for system-wide routing balance and fairness. For example, if multiple destinations exhibit highly similar association scores 172, system 100 may distribute coefficients more evenly to prevent over-selection of any single destination. Similarly, coefficients may be adjusted based on global constraints, such as workload balance, regional coverage, or performance decay factors, so that routing remains equitable and responsive to operational changes. In an embodiment, once normalized, the specialty coefficients 164 may be stored within the routing module 160 and/or associated database and supplied to the confidence-scoring engine. During downstream processing, these coefficients may serve as weighting parameters for the generation of routing confidence scores 162, allowing system 100 to dynamically prioritize destinations that exhibit the highest normalized alignment with the classified specialization. This normalization step thus may ensure consistent, interpretable, and scalable computation of routing relevance across a continuously evolving ontology and destination network.

Still referring to FIG. 1, in an embodiment, the specialty coefficient 164 may be received from an external processing pipeline 180 configured to analyze destination-specific metadata 166 and generate a coefficient representing an association strength between each hierarchical specialization node of the plurality of hierarchical specialization nodes 146. For purposes of this disclosure, an "external processing pipeline" is an auxiliary computational subsystem that performs analytical or model-driven computations on destination-specific metadata 166 to produce derived parameters. In an embodiment, the external processing pipeline 180 may operate as a separate software service, distributed compute process, or remote analytics engine that communicates with the routing module 160 through a defined data interface, such as an application programming interface (API) or message queue. In an embodiment, the external processing pipeline 180 may aggregate and process large-scale historical datasets containing destination metadata, routing logs, and performance outcomes 190. These datasets may be analyzed using machine-learning models, statistical correlation frameworks, and/or graph-based learning methods to infer the relative association strength between destination nodes 174 and ontology nodes. For example, the external pipeline may use a batch-learning routine to retrain coefficient values nightly or weekly, based on newly available routing performance data. In an embodiment, the resulting specialty coefficients 164 may then be transmitted to the routing module 160, stored in the destination-node database 176, or cached in-memory for use during active routing operations.

In further reference to FIG. 1, in another embodiment, the external processing pipeline 180 may be hosted on a cloud-based analytics environment or federated data infrastructure that allows sensitive destination data to remain within secure domains. In such configurations, the external pipeline may perform feature extraction and coefficient generation locally, transmitting only the resulting coefficients or anonymized summary statistics back to the central routing system. This design may enable compliance with privacy, data residency, and/or institutional governance requirements while still providing the routing module 160 with accurate and up-to-date coefficient values. The use of an external processing pipeline 180 may allow the overall system to scale efficiently by offloading high-volume analytics and model retraining tasks, while maintaining lightweight inference operations within the routing module 160. In an embodiment, this modular architecture may also facilitate interoperability with third-party analytics services, domain-specific machine-learning models, and/or organization-specific data repositories, enabling continuous enhancement of coefficient quality and adaptive recalibration of routing accuracy across the network.

In further reference to FIG. 1, in an embodiment, at least a processor 108 may be configured to route, using the routing module 160, the vector space representation 136 to a destination node 174 as a function of the routing confidence score 162. In an embodiment, routing may refer to the process of programmatically assigning or directing the classified data object, or its corresponding vector space representation 136, to one or more candidate destinations based on quantitatively derived indicators of relevance and capability. In an embodiment, the routing operation may occur automatically in real time or asynchronously within scheduled processing cycles, depending on system configuration. In an embodiment, the routing module 160 may receive, as input, a set of routing confidence scores 162 computed for a plurality of candidate destination nodes. Each routing confidence score 162 may reflect a composite evaluation incorporating specialty coefficients 164, classification confidence values, and contextual metadata such as jurisdiction or workload availability. In an embodiment, the routing module 160 may evaluate these scores according to configurable decision logic to determine the optimal destination node 174. In an embodiment, routing may be implemented through one or more procedural pathways. In one embodiment, the routing module 160 may generate a prioritized list of destinations ranked by descending routing confidence score 162 and automatically assign the domain-specific data object 120 to the highest-ranked destination. In another embodiment, the routing module 160 may output the ranked list to a human operator or downstream system interface for review and approval prior to final assignment. In some cases, the routing process may further include transmission of a routing payload containing metadata such as classification node identifiers, confidence metrics, and processing timestamps, enabling traceability and audit of routing decisions. In some implementations, routing may also be subject to constraint logic or policy layers that override or refine confidence-based selections. For example, certain destination nodes 174 may be excluded based on jurisdictional boundaries, resource constraints, and/or conflict-of-interest rules. Conversely, routing weights may be boosted for destinations that meet specific client-defined criteria, such as historical performance thresholds or preferred partner status. In an embodiment, this routing operation may effectively serve as the execution layer of system 100, translating learned and computed associations into actionable assignments that direct domain-specific data objects 120 to their most appropriate handling endpoints. By basing these decisions on normalized, data-driven confidence scores, system may ensure consistent, explainable, and performance-optimized routing across diverse specialization hierarchies.

With continued reference to FIG. 1, in an embodiment, the destination node 174 may be stored in a destination-node database 176. For purposes of this disclosure, a "destination-node database" is a structured data repository configured to store, manage, and serve information associated with each destination node 174 within the routing network. In an embodiment, each destination-node record may represent a discrete entity, such as a firm, practice group, service provider, or individual professional, and may contain both static attributes (e.g., name, location, specialization tags) and dynamic attributes (e.g., performance metrics, capacity indicators, and updated routing statistics). The destination-node database 176 may enable persistent storage of these entities in a form accessible to the routing module 160 and related computational subsystems. In an embodiment, the destination-node database 176 may be implemented as a graph database, relational database, or hybrid data store depending on the complexity of relationships between destinations and ontology nodes. In an embodiment, a graph-based implementation may represent destinations as nodes connected to specialization categories, geographic regions, and metadata objects via weighted edges, allowing efficient traversal and retrieval of semantically related destinations. Alternatively, a relational or key-value store implementation may instead index destinations by unique identifiers, enabling rapid lookup of destination attributes during coefficient and confidence score calculations. In an embodiment, each record in the destination-node database 176 may include fields such as, without limitation: (i) a destination identifier; (ii) associated ontology-node mappings; (iii) specialty coefficients 164 and their last update timestamps; (iv) destination-specific metadata fields (e.g., success rate, client satisfaction metrics, or available resources); and/or (v) operational constraints or routing policies applicable to that destination. In some embodiments, records may also include vectorized representations, such as destination feature vectors 168, stored in a linked vector index or embedding repository to facilitate similarity-based retrieval by the routing module 160. In an embodiment, the destination-node database 176 may be updated continuously or periodically through one or more ingestion pipelines that receive input from external systems, manual administrative updates, or feedback data 192 generated from completed routing cycles. For example, when a case is successfully routed and resolved, the resulting performance outcome may trigger an update of that destination's specialty coefficients 164, confidence metrics, and historical success rate within the database. In some embodiments, the destination-node database 176 may expose an application programming interface (API) or message bus interface that allows the routing module 160, external processing pipelines 180, or third-party systems to query, modify, or synchronize destination data in real time. In an embodiment, this architecture may ensure that the system's routing decisions operate on the most current and contextually accurate destination information.

Still referring to FIG. 1, in an embodiment, at least a processor 108 may be configured to access the destination-node database 176 and retrieve a destination node object representation 178 as a function of the at least one node 142 of the ontology structure 144. For purposes of this disclosure, a "destination node object representation" is a structured digital construct that encapsulates data elements, relationships, and computed parameters associated with a particular destination node 174 in a format usable by downstream modules. In an embodiment, the destination node object representation 178 may serve as the computational instance of a stored destination node 174, providing at least a processor 108 with a unified object through which routing relevance, similarity, and performance calculations can be performed. In an embodiment, each destination node object representation 178 may include fields such as, without limitation: (i) a destination identifier; (ii) associated ontology-node references; (iii) the destination feature vector 168; (iv) one or more specialty coefficients 164; (v) metadata attributes such as performance statistics, workload indicators, or jurisdictional coverage; and/or (vi) system-level attributes such as timestamps, confidence thresholds, and routing eligibility flags. Together, these fields may form a complete and dynamically updatable representation of the destination node's operational profile within the routing ecosystem.

In continued reference to FIG. 1, in an embodiment, at least a processor 108 may generate or retrieve destination node object representations 178 by querying the destination-node database 176 according to one or more ontology-node identifiers output by the classification module 140. For example, when an input case or data object is classified to the ontology node "Trucking Litigation," the routing module 160 may access the database and retrieve destination node object representations 178 corresponding to firms or providers historically or semantically linked to that specialization. In some embodiments, retrieval may be conditioned on hierarchical proximity, such that destinations connected to both parent ("Personal Injury") and child ("Commercial Carrier Liability") nodes are also included. In another embodiment, destination node object representations 178 may be constructed dynamically at runtime. In an embodiment, the routing module 160 may aggregate metadata, specialty coefficients 164, and real-time operational data from multiple system components, such as availability services, analytics APIs, or external processing pipelines 180, to build an up-to-date object representation before computing final routing scores. This approach may ensure that routing decisions reflect the most current data rather than relying solely on static records. In an embodiment, destination node object representations 178 may be temporarily stored in memory, cached within the routing module 160, and/or serialized for network transmission as part of a routing payload. In this way, the destination node object representation 178 may function as the fundamental data unit that bridges the ontology-based classification output to the concrete routing endpoint, enabling at least a processor 108 to evaluate and select destinations with both semantic accuracy and operational awareness.

With further reference to FIG. 1, in an embodiment, routing the vector space representation 136 to the destination node 174 may include retrieving the routing confidence score 162 for each of a plurality of destination nodes 174. In an embodiment, retrieving the routing confidence score 162 may refer to the process by which the routing module 160 accesses, computes, and/or updates confidence values representing the relative suitability of each candidate destination for handling a classified data object. In an embodiment, each routing confidence score 162 may integrate multiple quantitative inputs, including specialty coefficients 164, classification confidence values, and contextual factors such as jurisdiction, workload, and historical outcome metrics, to form a unified measure of routing relevance. In an embodiment, routing confidence scores 162 may be stored within the destination-node database 176 as continuously updated values associated with each destination node 174. In an embodiment, at least a processor 108 may query these precomputed scores during runtime for efficiency, particularly in high-throughput or real-time routing environments. In another embodiment, routing confidence scores 162 may be computed dynamically at the time of routing by the routing module 160, using the most recent specialty coefficients 164 and destination metadata available in the system. Dynamic computation may ensure that routing decisions reflect real-world fluctuations such as recent performance changes, updated caseloads, and/or temporary unavailability of a destination.

In further reference to FIG. 1, in an embodiment, the retrieval process may involve collecting confidence scores for all destination nodes 174 linked to the active ontology node and/or for a filtered subset based on hierarchical or regional criteria. For example, when the classification output corresponds to the ontology node "Medical Malpractice," the routing module 160 may retrieve confidence scores for all destinations associated with both the parent node "Personal Injury" and related sub-nodes such as "Surgical Negligence" or "Hospital Liability." This may enable comprehensive evaluation of both direct and adjacent specialization alignments. In some embodiments, the routing module 160 may also retrieve confidence scores from an external analytics service or scoring cache maintained by an external processing pipeline 180. This design may allow large-scale recalibration of scores to occur asynchronously, while routing inference remains lightweight and responsive. In an embodiment, retrieved scores may be normalized or weighted according to system configuration before entering the ranking process. By retrieving the routing confidence scores 162 across a plurality of destination nodes 174, system 100 may establish a quantitative basis for comparative ranking, ensuring that routing decisions are informed by the most accurate and up-to-date assessments of destination suitability.

In continued reference to FIG. 1, in an embodiment, routing the vector space representation 136 to the destination node 174 may include ranking the plurality of destination nodes 174 as a function of the routing confidence score 162 of each of the plurality of destination nodes 174. In an embodiment, ranking may refer to the process of ordering a plurality of candidate destination nodes 174 according to their respective routing confidence scores 162 to determine their relative suitability for receiving the classified data object. The ranking operation may enable the routing module 160 to identify not only the single highest-confidence destination, but also secondary or tertiary candidates that may serve as backups or be selected under alternative routing conditions. In an embodiment, at least a processor 108 may perform ranking by sorting all candidate destination nodes 174 in descending order of routing confidence score 162. In an embodiment, the resulting ranked list may be stored in memory, presented to a downstream process, and/or passed to a user interface that supports human-in-the-loop review or override. In some embodiments, ranking may also account for additional weighting criteria beyond the raw confidence score, such as fairness adjustments, capacity balancing, and/or priority modifiers defined by policy. For example, destinations with similar confidence scores may be reordered to favor underutilized nodes or those with geographic proximity to the client or case source.

With continued reference to FIG. 1, in another embodiment, ranking may occur hierarchically across multiple ontology levels. In an embodiment, the routing module 160 may first group destinations according to their parent specialization nodes, rank destinations within each group, and then compare top candidates across groups to identify the most contextually aligned node. This hierarchical ranking approach may ensure that closely related specializations are evaluated together before cross-domain comparisons are made. In further embodiments, ranking may be accompanied by confidence stratification or thresholding logic that filters out destinations whose scores fall below a predefined confidence floor. In an embodiment, at least a processor 108 may apply thresholding dynamically, adjusting it based on the variability or dispersion of routing confidence scores 162 across the candidate set. For example, when all candidates exhibit tightly clustered scores, a higher threshold may be applied to ensure selection of only the most distinctively qualified destinations. In an embodiment, the ranked set of destination nodes 174 may form the foundation for the subsequent routing selection process. By establishing an ordered hierarchy of candidate destinations derived from normalized and data-driven confidence scores, system 100 may ensure that routing outcomes remain consistent, explainable, and optimized for specialization relevance and performance efficiency.

Still referring to FIG. 1, in an embodiment, routing the vector space representation 136 to the destination node 174 may include selecting the destination node 174 as a function of ranking the plurality of destination nodes 174. In an embodiment, selection may refer to the automated or semi-automated process of identifying one or more destination nodes 174 from an ordered set of candidates based on ranking results derived from routing confidence scores 162. The selection process may serve as the decisive action within the routing pipeline, translating the system's probabilistic or weighted assessments into a discrete routing outcome that links the classified data object to a specific endpoint. In an embodiment, at least a processor 108 may select the highest-ranked destination node 174 whose routing confidence score 162 satisfies or exceeds a predefined threshold. This threshold may be dynamically adjustable, for example, based on the confidence dispersion across all candidates or system-level routing constraints such as workload balancing, specialization diversity, or contractual priority tiers. In an embodiment, selection criteria may therefore integrate both quantitative score comparisons and qualitative routing policies. In another embodiment, at least a processor 108 may employ a top-k selection strategy, wherein the top k ranked destinations (e.g., top three) are retrieved for additional downstream evaluation. Such downstream logic may include, without limitation, applying region-based filters, performing compliance verification, and/or invoking a human-in-the-loop validation workflow. For instance, in a legal referral system, the top-ranked firm might automatically receive the referral unless jurisdictional or conflict-of-interest constraints are detected, in which case the next eligible destination in the ranked list would be selected. In further embodiments, the selection process may be probabilistic rather than deterministic. In an embodiment, the routing module 160 may sample from the ranked destination nodes 174 according to their normalized routing confidence scores 162, allowing controlled exploration of alternative routes. This approach may facilitate data collection for model retraining and help prevent overfitting to specific destinations by diversifying referral outcomes across similarly qualified nodes. Once the final destination node 174 is selected, at least a processor 108 may generate a routing transaction record associating the domain-specific data object 120, the selected destination node 174, the computed routing confidence score 162, and/or contextual metadata such as timestamps, decision parameters, and version identifiers of the underlying models. In an embodiment, this record may be stored in a secure audit log or transmitted to an external analytics pipeline for post-routing analysis and performance tracking. In an embodiment, through the structured selection process described above, system 100 may ensure that routing operations are not only data-driven and reproducible but also dynamically responsive to real-world changes in destination availability, specialization performance, and confidence calibration.

In further reference to FIG. 1, in an embodiment, at least a processor 108 may be configured to update the routing module 160 as a function of performance outcomes 190. For purposes of this disclosure, a "performance outcome" is a quantifiable or categorical indicator that reflects the effectiveness, accuracy, or success of a prior routing decision. In an embodiment, performance outcomes 190 may capture both objective and subjective measures of success depending on the domain context. Non-limiting examples may include completion rates, resolution times, satisfaction scores, referral acceptance ratios, and/or accuracy of case-to-specialization alignment. In some embodiments, performance outcomes 190 may further include error rates, escalation events, or manually logged feedback entries that signal suboptimal routing. In an embodiment, performance outcomes 190 may serve as supervisory data that enable the routing module 160 to continuously refine its internal parameters, including specialty coefficients 164, weighting functions, and/or decision thresholds. Each outcome can be associated with a specific domain-specific data object 120, the corresponding destination node 174, and/or the computed routing confidence score 162 used during the original routing event. In an embodiment, at least a processor 108 may aggregate such performance outcomes 190 over time to construct a structured training or update dataset that represents real-world routing efficacy.

With further reference to FIG. 1, in an embodiment, the routing module 160 may include a feedback ingestion layer configured to monitor post-routing events and capture outcome data from integrated systems, such as case management databases, client response platforms, and/or analytics services. For instance, when a routed legal case concludes, system 100 may receive structured metadata indicating whether the case type matched the firm's specialization and whether the outcome met expected performance thresholds. In an embodiment, this feedback may then be parsed, normalized, and appended to a cumulative performance log used to trigger model retraining or incremental parameter updates. By incorporating performance outcomes 190 as a governing variable in routing module 160 updates, system 100 may ensure that its classification and routing processes remain data-driven, empirically validated, and adaptive to evolving domain performance trends.

With continued reference to FIG. 1, in an embodiment, updating the routing module 160 may include receiving feedback data 192 associated with the domain-specific data object 120 and the destination node 174. For purposes of this disclosure, "feedback data" is information that conveys post-routing performance metrics, behavioral signals, or evaluative outcomes generated after the initial routing operation. In contrast to static metadata or training data, feedback data 192 may represent dynamically acquired evidence reflecting how accurately or effectively the system's routing decision aligned with real-world results. In an embodiment, feedback data 192 may include, without limitation, quantitative measures such as success flags (e.g., resolved/unresolved), completion durations, and/or scalar ratings derived from transaction logs, case outcomes, and/or client evaluations. In an embodiment, feedback data 192 may also include qualitative or categorical attributes such as reviewer assessments, diagnostic labels, and/or textual comments processed through natural language understanding pipelines. In some implementations, feedback data 192 may be collected automatically from external data systems, such as case management software, user analytics services, or client relationship management databases, or may be input manually by administrators verifying the appropriateness of a given routing decision. In an embodiment, at least a processor 108 may receive feedback data 192 through one or more communication channels associated with the electronic communication interface 126 defined earlier. For example, in a referral routing embodiment, system 100 may receive a structured data payload from a downstream application upon case completion, containing fields such as "destination_id," "case_resolution_status," "client_rating," and "processing_duration." In an embodiment, the routing module 160 may then parse this payload, validate its format, and store the normalized result in a feedback repository or training data buffer for use in recalibration cycles. In some embodiments, feedback data 192 may be temporally linked to the original routing decision through a unique routing transaction identifier. This linkage may allow at least a processor 108 to correlate the feedback with the input domain-specific data object 120, the ontology node classification, and the computed routing confidence score 162. Maintaining this association may enable supervised updates to the specialty coefficients 164 and help ensure that each recalibration iteration is grounded in verifiable routing outcomes. By continuously receiving and integrating feedback data 192, system 100 may establish a closed-loop architecture in which empirical results directly inform subsequent routing behavior, thereby enabling adaptive performance optimization across successive operational cycles.

Still referring to FIG. 1, in an embodiment, updating the routing module 160 may include generating destination-level performance features 194 as a function of the feedback data 192. For purposes of this disclosure, "destination-level performance features" are normalized, structured descriptors that quantify how effectively each destination node 174 has performed across one or more routed cases over time. In an embodiment, each feature may represent a statistical, temporal, and/or categorical signal derived from the raw feedback data 192 and aggregated at the level of the destination node 174. Collectively, destination-level performance features 194 may provide a measurable representation of a node's historical success, reliability, and specialization accuracy. In an embodiment, at least a processor 108 may parse feedback data 192 streams and compute per-destination metrics such as average success rate, median resolution time, and/or weighted client satisfaction score. Additional features may include referral acceptance ratio, variance in case-type alignment, and/or normalized deviation from expected workload capacity. In an embodiment, these computed values may then be stored as feature vectors associated with each destination node 174 in memory or within the destination-node database 176. In some embodiments, feature generation may include temporal aggregation. In an embodiment, at least a processor 108 may segment performance data into rolling time windows, such as daily, weekly, or quarterly intervals, to capture trends and detect performance drift. For instance, a destination node 174 whose average outcome rating decreases over multiple intervals may trigger a recalibration flag or down-weighting in subsequent routing calculations. In other embodiments, system 100 may generate composite or derived performance features that blend multiple data types. For example, at least a processor 108 may compute a stability index by combining outcome consistency with workload volatility, or a domain-fit score by correlating recent case-type distributions against the node's declared specialization vector. Such multidimensional features may enable the routing module 160 to capture not only static effectiveness but also adaptability and precision over time. By converting heterogeneous feedback data 192 into destination-level performance features 194, system 100 may create a uniform analytical foundation for retraining and coefficient adjustment. This representation may allow the routing module 160 to update specialization strength, recalibrate routing confidence, and continuously align referral outcomes with evolving real-world performance characteristics.

With further reference to FIG. 1, in an embodiment, updating the routing module 160 may include generating an updated specialty coefficient 196 by correlating the destination-level performance features 194 with the at least one node 142 of the ontology structure 144. In an embodiment, correlating may refer to the process of quantitatively or statistically measuring the degree of alignment between observed performance data for a given destination node 174 and the specialization attributes represented by an ontology node. The resulting updated specialty coefficient 196 may serve as a calibrated weighting factor that expresses the strength of association between the destination node's demonstrated outcomes and its designated domain specialization. In an embodiment, at least a processor 108 may compute the updated specialty coefficient 196 by aggregating destination-level performance features 194, such as outcome precision, resolution efficiency, and satisfaction scores, and mapping them to the semantic or hierarchical identifiers of ontology nodes. In an embodiment, this mapping may occur through similarity metrics, regression models, and/or learned projection layers that align performance feature vectors with ontology-node embeddings 170. For instance, if a destination node 174 consistently exhibits high success rates for cases tagged under the "Medical Malpractice" node and moderate performance for "Personal Injury (General)," the updated specialty coefficient 196 for the former may be strengthened relative to the latter.

In further reference to FIG. 1, in some embodiments, the correlation process may employ a feature-weighted approach in which certain destination-level features (e.g., accuracy or satisfaction) are prioritized over others (e.g., response time) based on configurable system policies or learned importance values. In an embodiment, the routing module 160 may dynamically adjust these feature weights over time to reflect domain priorities or performance variability across specialization categories. In further embodiments, the updated specialty coefficient 196 may be represented as a scalar value, a normalized score vector, and/or a probabilistic distribution across related ontology nodes. The form of representation may depend on the downstream model architecture, such as whether the routing confidence computation expects a single coefficient per node or a multi-dimensional vector capturing uncertainty. In an embodiment, the recalibrated coefficient thus may act as a bridge between empirical performance observations and the routing model's internal decision logic, ensuring that routing predictions evolve in proportion to demonstrated specialization effectiveness. By generating updated specialty coefficients 164 through correlation with destination-level performance features 194, system may continuously align its learned routing parameters with real-world outcomes, thereby maintaining high specialization fidelity and adaptive performance across operational cycles.

In continued reference to FIG. 1, in an embodiment, updating the routing module 160 may include recalibrating the routing module 160 as a function of the updated specialty coefficient 196. In an embodiment, recalibration may refer to the process of modifying one or more internal parameters, weights, or thresholds of the routing module 160 to reflect newly derived insights about destination performance and specialization accuracy. In an embodiment, the recalibration process may ensure that the routing module's future confidence calculations, ranking logic, and/or selection behaviors remain aligned with current empirical evidence captured through the updated specialty coefficients 164. In an embodiment, recalibration may include adjusting the routing module's weighting matrices or normalization constants such that routing confidence scores 162 become proportionally sensitive to improved or degraded specialization performance. For example, when a destination node's updated specialty coefficient 196 for an ontology node increases following consistent success in a particular domain, the routing module 160 may amplify the weighting applied to that node in future routing operations. Conversely, when a coefficient decreases, indicating diminished performance or misalignment, the module may automatically down-weight that node or reroute traffic toward alternative, better-performing destinations. In some embodiments, recalibration may be implemented as a lightweight online learning process that incrementally updates model parameters after each feedback cycle. In an embodiment, at least a processor 108 may maintain running averages or exponential decay functions over recent specialty coefficient 164 updates to avoid overfitting to short-term fluctuations. In other embodiments, recalibration may occur in batch mode, during scheduled retraining intervals, where a larger set of accumulated feedback and performance features is used to comprehensively retrain or fine-tune the routing model. In further embodiments, recalibration may include updating auxiliary system parameters such as routing thresholds, normalization ranges, or feature-scaling constants used in the computation of routing confidence scores 162. In an embodiment, these adjustments may ensure that changes in specialty coefficients 164 propagate consistently through the downstream scoring and ranking functions. By recalibrating the routing module 160 as a function of the updated specialty coefficient 196, system 100 may close its adaptive feedback loop, enabling routing behaviors that evolve continuously in response to observed real-world outcomes while maintaining numerical stability and explainability across successive operational cycles.

Still referring to FIG. 1, in an embodiment, recalibrating the routing module 160 may include detecting a recalibration trigger 198. For purposes of this disclosure, a "recalibration trigger" is a system event, condition, or threshold that signals the need to update, retrain, or otherwise adjust parameters within the routing module 160 based on new or accumulated information. In an embodiment, the recalibration trigger 198 may govern when adaptive learning processes are initiated, ensuring that updates occur only when sufficient feedback evidence or system deviation justifies recalibration. In an embodiment, recalibration triggers 198 may be data-driven, time-based, and/or performance-based. In a data-driven embodiment, the recalibration trigger 198 may activate when a predefined quantity or quality of feedback data 192 has been received, such as a minimum number of new performance outcomes 190 or destination-level performance feature updates. For example, the routing module 160 may initiate recalibration once it has accumulated 500 new labeled referral outcomes across at least three ontology nodes. In a time-based embodiment, recalibration may occur at periodic intervals (e.g., daily, weekly, or quarterly), depending on the operational cadence and data velocity of the system. In an embodiment, scheduled recalibration may ensure consistency and synchronization across distributed routing instances, particularly in multi-region or multi-firm deployments. In a performance-based embodiment, recalibration may be triggered when system 100 detects performance drift, instability, or degradation in routing accuracy. In an embodiment, such detection may be derived from monitoring statistics such as a drop in average routing confidence, a deviation between predicted and realized performance outcomes 190, and/or an increase in error rate beyond a tolerance threshold. When these deviations exceed configurable bounds, system 100 may autonomously issue a recalibration signal to restore alignment between model parameters and empirical performance trends. In some embodiments, the recalibration trigger 198 may also be externally initiated; for example, by an administrative interface, an external analytics pipeline, or an orchestration layer that manages multiple routing models across domains. This may allow human operators or automated meta-controllers to coordinate recalibration cycles at scale. By detecting a recalibration trigger 198 prior to initiating parameter updates, system 100 may ensure that its adaptive learning processes remain efficient, targeted, and explainable, executing only under conditions that meaningfully improve the accuracy, stability, or fairness of routing operations.

In further reference to FIG. 1, in an embodiment, recalibrating the routing module 160 may include updating the specialty coefficient 164 of the at least one node 142 of the ontology structure 144 as a function of the updated specialty coefficient 196. In an embodiment, updating the specialty coefficient 164 may refer to modifying the stored or active weighting value associated with an ontology node to reflect the most recent correlation between destination-level performance features 194 and specialization accuracy. In an embodiment, the ontology structure 144, as a hierarchical data representation of domain expertise, may maintain these coefficients as numerical or vectorized indicators of how strongly each node is supported by empirical routing evidence. In an embodiment, at least a processor 108 may locate the target ontology node or nodes corresponding to the classification categories previously associated with the routed data objects and replace or blend their existing specialty coefficients 164 with the newly updated values. This may involve direct substitution, weighted averaging, and/or incremental adjustment methods. For instance, if the previous coefficient for "Medical Malpractice" was 0.76 and the updated coefficient derived from new performance data is 0.82, the recalibration process may either replace the prior coefficient entirely or compute a smoothed update (e.g., by applying a 70/30 blend of historical and current values) to preserve continuity. In some embodiments, at least a processor 108 may propagate coefficient updates not only to the directly affected node but also to related nodes within the ontology hierarchy. In an embodiment, upward propagation may occur to parent categories (e.g., "Personal Injury") to adjust higher-level domain strength, while downward propagation may distribute changes to subnodes (e.g., "Surgical Negligence" or "Pharmaceutical Error") according to semantic proximity weights. This hierarchical adjustment may ensure that specialization accuracy remains contextually balanced across interconnected ontology levels.

In continued reference to FIG. 1, in further embodiments, updated specialty coefficients 164 may be versioned or timestamped within the ontology data store. In an embodiment, version control may allow the routing module 160 to trace historical parameter changes, roll back updates if instability is detected, or analyze temporal evolution of specialization alignment. In some cases, the updated coefficients may also be serialized and transmitted to other instances of the routing module 160 within a distributed environment to maintain synchronization across nodes of a federated routing system. By updating the specialty coefficients 164 of ontology nodes in this structured manner, system 100 may ensures that the semantic foundation of its routing model remains dynamically reflective of empirical performance data, enabling sustained accuracy and explainability in future classification and routing operations.

With continued reference to FIG. 1, in an embodiment, recalibrating the routing module 160 may include storing updated routing model parameters within the routing module 160 for use in subsequent generation of routing confidence scores 162. For purposes of this disclosure, "routing model parameters" refer to the internal numerical values, weight matrices, configuration coefficients, and normalization constants that collectively determine how the routing module 160 evaluates and scores candidate destination nodes 174. In an embodiment, routing model parameters may include, but are not limited to, updated specialty coefficients 164, feature-scaling factors, and/or bias terms associated with the computation of routing confidence scores 162. Storing updated routing model parameters may ensure that recalibrated relationships between ontology nodes, destination metadata, and performance outcomes 190 are persistently applied during subsequent inference operations. In an embodiment, at least a processor 108 may store updated parameters within a parameter persistence layer of the routing module 160, which may include a structured database, an in-memory key-value store, and/or a version-controlled model registry. The persistence layer may tag each parameter set with metadata including timestamp, version identifier, recalibration trigger 198 source, and training dataset signature. In an embodiment, such metadata may enable traceability of routing behavior across system updates and supports reproducible evaluations of historical routing decisions.

Still referring to FIG. 1, in some embodiments, at least a processor 108 may also serialize the updated parameters into a model checkpoint format compatible with the underlying machine-learning architecture of the routing module 160. In an embodiment, this may allow the updated model state to be efficiently loaded during initialization of subsequent routing sessions or deployed across distributed processing nodes. In cloud-based implementations, the checkpointed model state may be stored in a secure containerized repository and automatically retrieved during runtime by each routing instance to maintain parameter consistency across all operational environments. In further embodiments, system 100 may maintain both active and archived versions of routing model parameters. In an embodiment, the active version may represent the current model state used for real-time inference, while archived versions may be retained for auditing, compliance, or rollback purposes. This dual-storage strategy may allow system 100 to revert to prior parameter states in the event that a recalibration cycle introduces instability or unanticipated routing bias. By storing updated routing model parameters within the routing module 160, system 100 may ensure that the results of each recalibration cycle are durable, recoverable, and available for subsequent routing operations. This persistence mechanism may close the adaptive learning loop, enabling sustained improvement of routing accuracy and consistency across future domain-specific data processing events.

Figure 2:
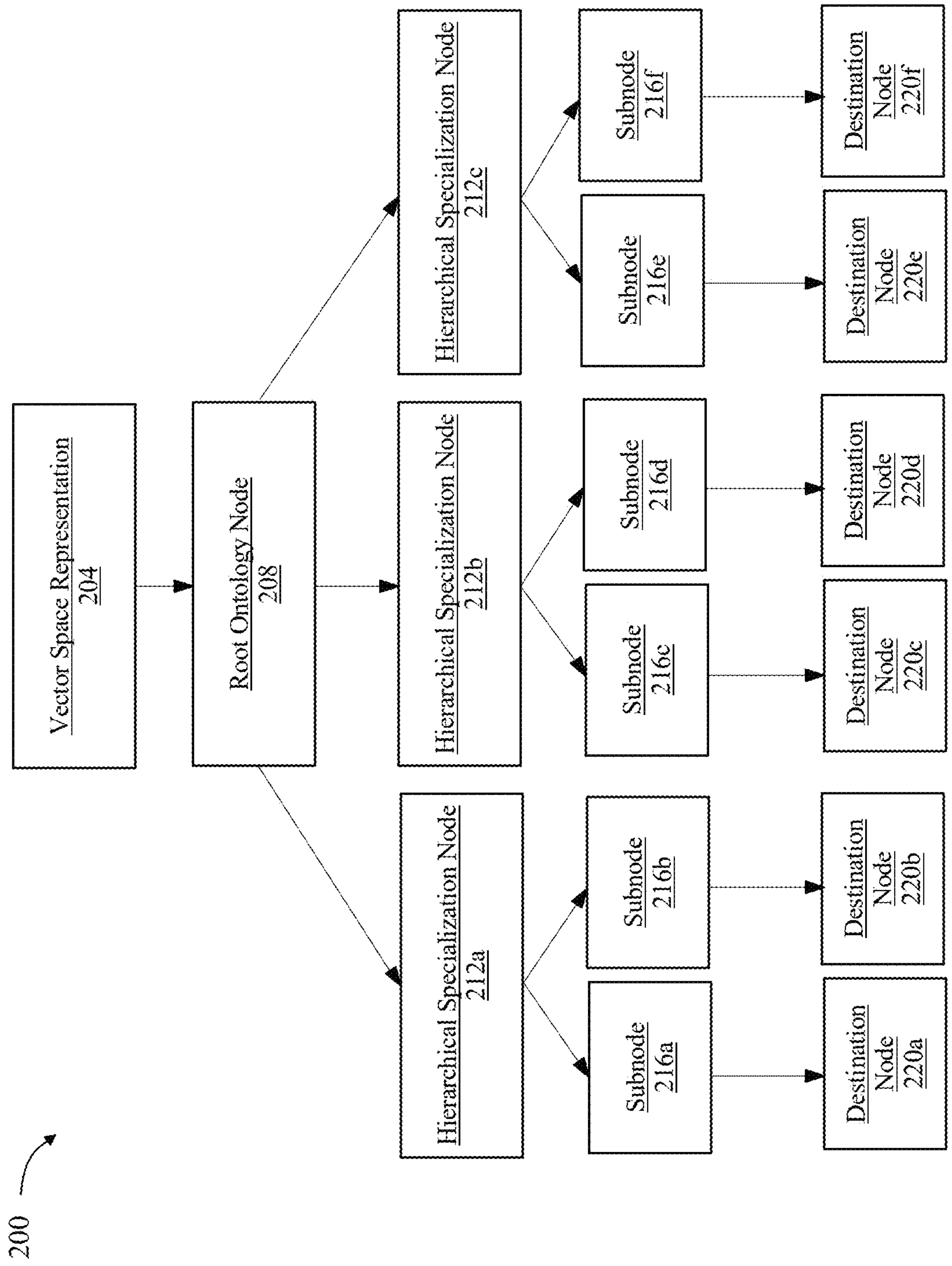
FIG. 2 illustrates an exemplary hierarchical ontology structure.

Now referring to FIG. 2, an exemplary hierarchical ontology structure 200 utilized by the system to organize and map encoded representations of domain-specific data objects to corresponding destination nodes. FIG. 2 provides structural context for how a vector space representation 204, generated by a language processing module, may be associated with a root ontology node 208 representing a high-level domain concept. In the illustrated embodiment, the ontology is arranged as a directed acyclic graph wherein each node maintains one or more child relationships, thereby enabling hierarchical specialization and inheritance of learned attributes. In an embodiment, the vectorized input data may be semantically grounded within a structured representation space that allows efficient classification and routing operations across multiple domain layers. Each hierarchical specialization node 212*a*-212*c* within the ontology structure may define a progressively narrower sub-domain of expertise. For example, a node may represent "Personal Injury," which may include subnodes 216*a* and 216*b* corresponding to "Trucking Litigation" and "Medical Malpractice." These nodes may function as discrete data objects containing node embeddings and statistical descriptors trained on historical case corpora. Similarly, other exemplary subnodes 216*c*, 216*d*, 216*e* and 216*f* are shown in FIG. 2. In an embodiment, the hierarchical configuration may enable the classification module to compute similarity metrics across multiple semantic levels, improving discrimination between closely related categories while maintaining contextual continuity with the parent domain. This hierarchical framework may be technically advantageous because it reduces classification ambiguity by enforcing structured relationships among nodes rather than relying on flat categorical assignment.

With continued reference to FIG. 2, at the terminal layer of the ontology, each destination node 220*a*-220*f* may correspond to a tangible or digital entity capable of receiving the routed data object, for instance, a law firm, practice group, and/or automated workflow endpoint. Each destination node may be associated with destination-specific metadata 166 including specialization descriptors, performance statistics, and historical routing outcomes. The routing module may apply specialty coefficients that weight the relevance of each destination node relative to the classified hierarchical specialization node. These coefficients may be used to generate a routing confidence score for each potential destination, thereby quantifying the degree of alignment between the encoded input and the expertise profile of each node. This structural mapping may allow the routing system to operate deterministically, providing interpretable and verifiable pathways from data ingestion to destination selection.

In further reference to FIG. 2, in an embodiment, the hierarchical ontology structure may interface with both the classification and routing subsystems to enable end-to-end semantic mapping and adaptive decision-making. When a domain-specific data object is encoded into a vector space representation, the classification subsystem may traverse the ontology to identify one or more specialization nodes exhibiting maximum representational similarity. These nodes may establish the contextual anchor points that determine the subset of destination nodes eligible for routing. The routing subsystem may then retrieve metadata and learned coefficients associated with those eligible destinations to calculate corresponding routing confidence scores. The ontology thus may serve as a continuously evolving data backbone that unifies classification and routing logic, allowing the system to dynamically adjust hierarchical relationships, coefficients, and destination eligibility criteria as new feedback data and performance outcomes are ingested. This integration may ensure that the routing pathway remains both semantically coherent and computationally optimized across successive processing cycles.

Figure 3:
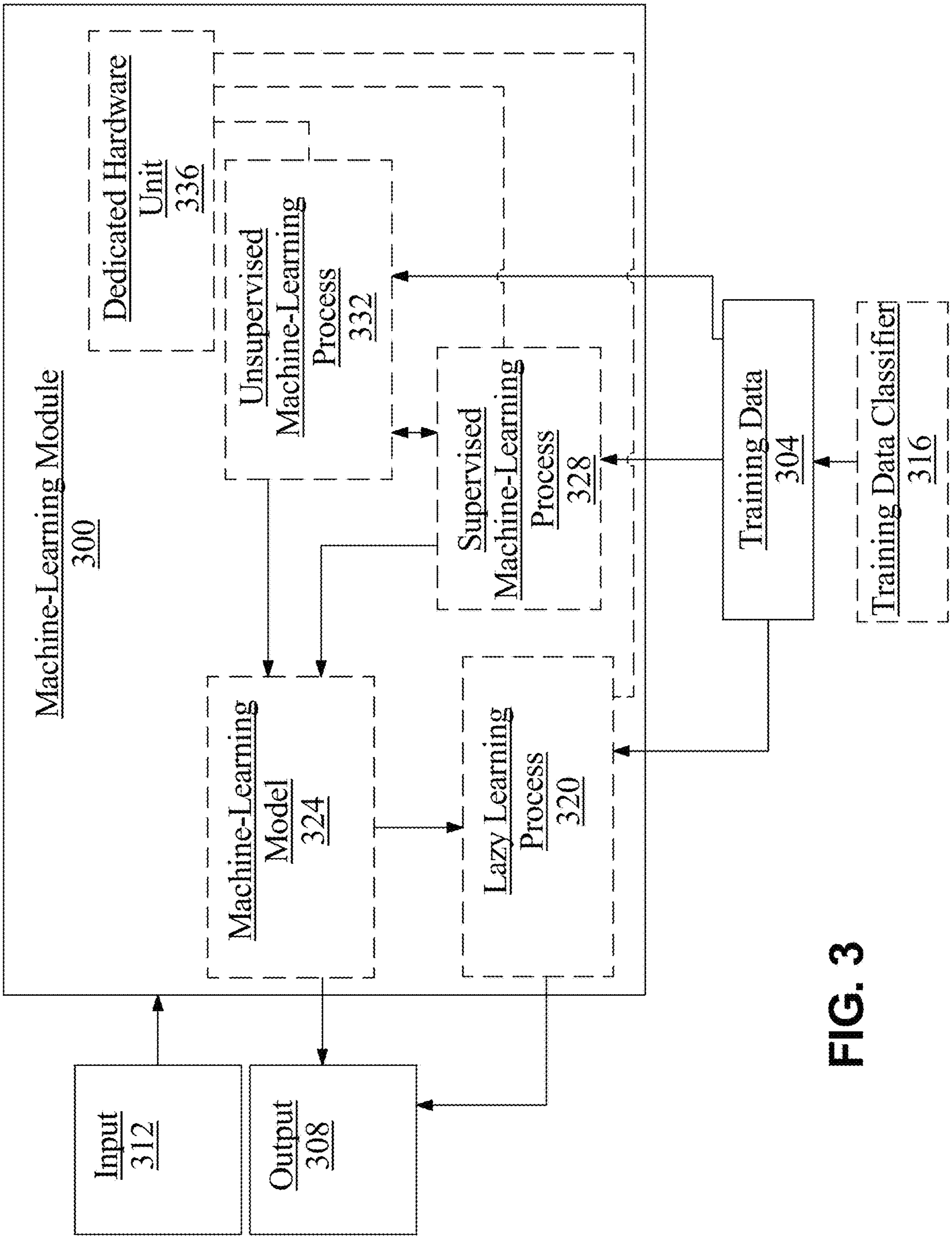
FIG. 3 is a diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include domain-specific data objects comprising natural-language case descriptions, structured metadata, and associated contextual attributes such as referring source identifiers or jurisdictional tags. Output data may include one or more labels corresponding to ontology nodes representing case-type specializations (e.g., "Medical Malpractice," "Employment Litigation," "Intellectual Property Dispute") and downstream routing parameters such as destination-node identifiers or routing confidence scores. In such an embodiment, the machine-learning module may learn statistical correlations between linguistic features (e.g., token sequences, embeddings, or term frequency distributions) and classification outcomes (e.g., accurate specialization mapping or routing success rates). These correlations enable the trained model to generalize to unseen data objects, accurately assigning specialization categories and generating routing predictions during inference.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-populations representing distinct specialization domains or referral cohorts, such as groups of destination nodes that exhibit similar performance patterns, or clusters of domain-specific data objects associated with a common ontology node. In some embodiments, the classifier may be trained to separate training examples into categories such as "high-confidence routing pairs," "ambiguous classification samples," or "low-performance destinations." These sub-populations enable the system to refine its model calibration pipeline, for instance, by directing high-quality, well-labeled data to supervised retraining routines while allocating ambiguous or noisy samples to unsupervised clustering or semi-supervised learning workflows.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:\ X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
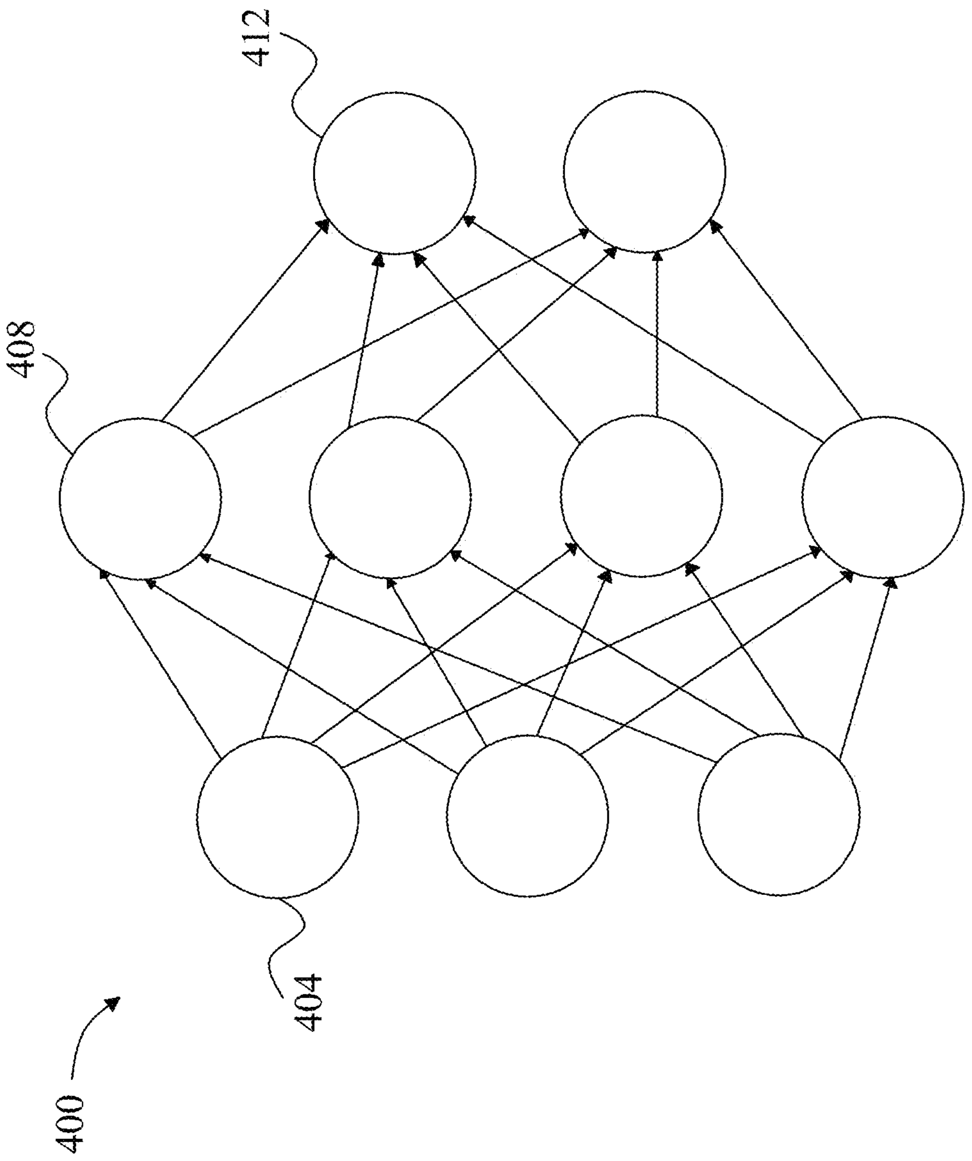
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
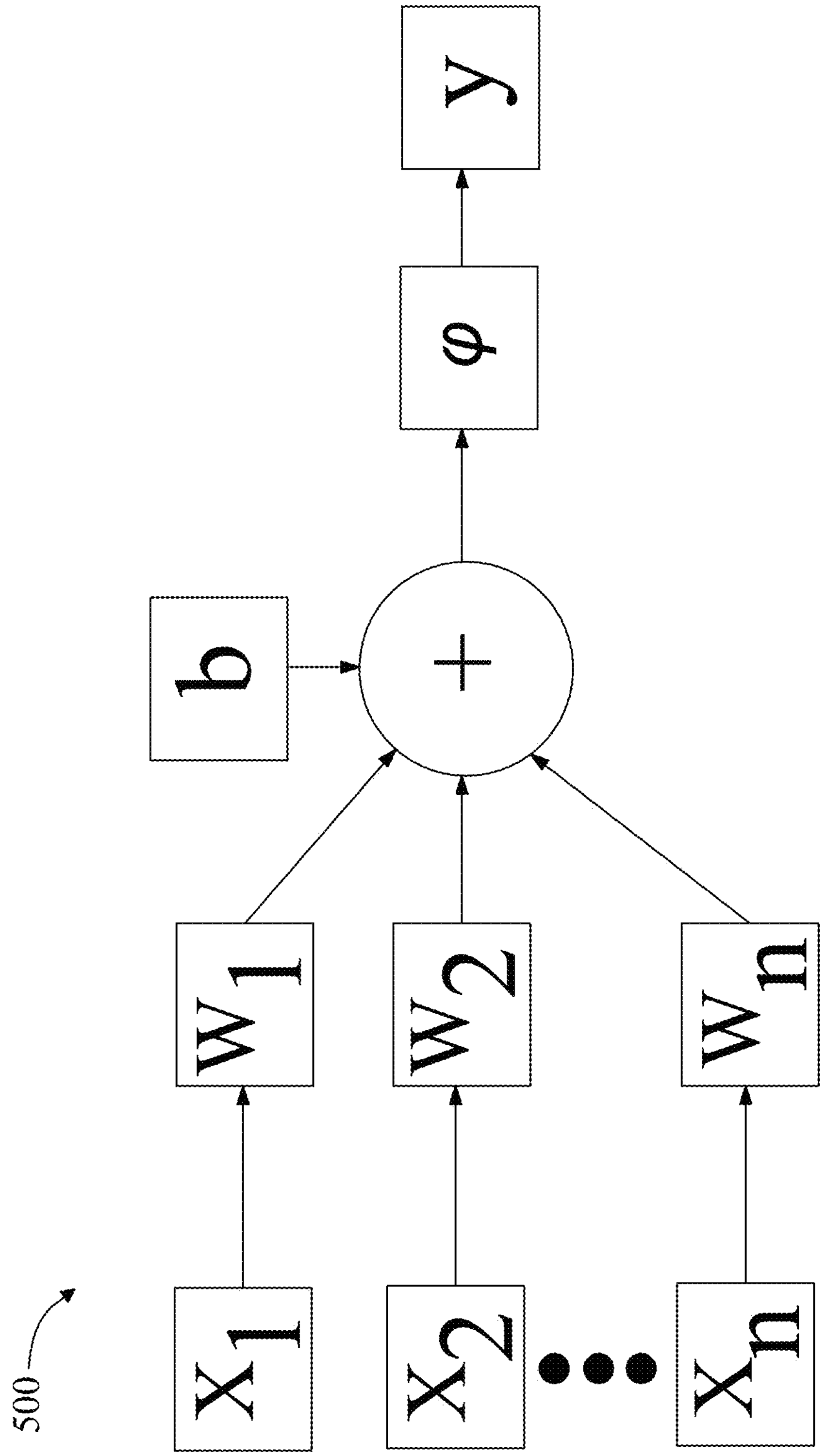
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as f(x)=tan $h^2(x)$, a rectified linear unit function such as f(x)=max(0,x), a "leaky" and/or "parametric" rectified linear unit function such as f(x)=max (ax,x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tan h(\sqrt{2/\pi}(x+bx^r)))$ for some values of a, b, and r, and/or a scaled exponential linear unit function such as $$f(x) = \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
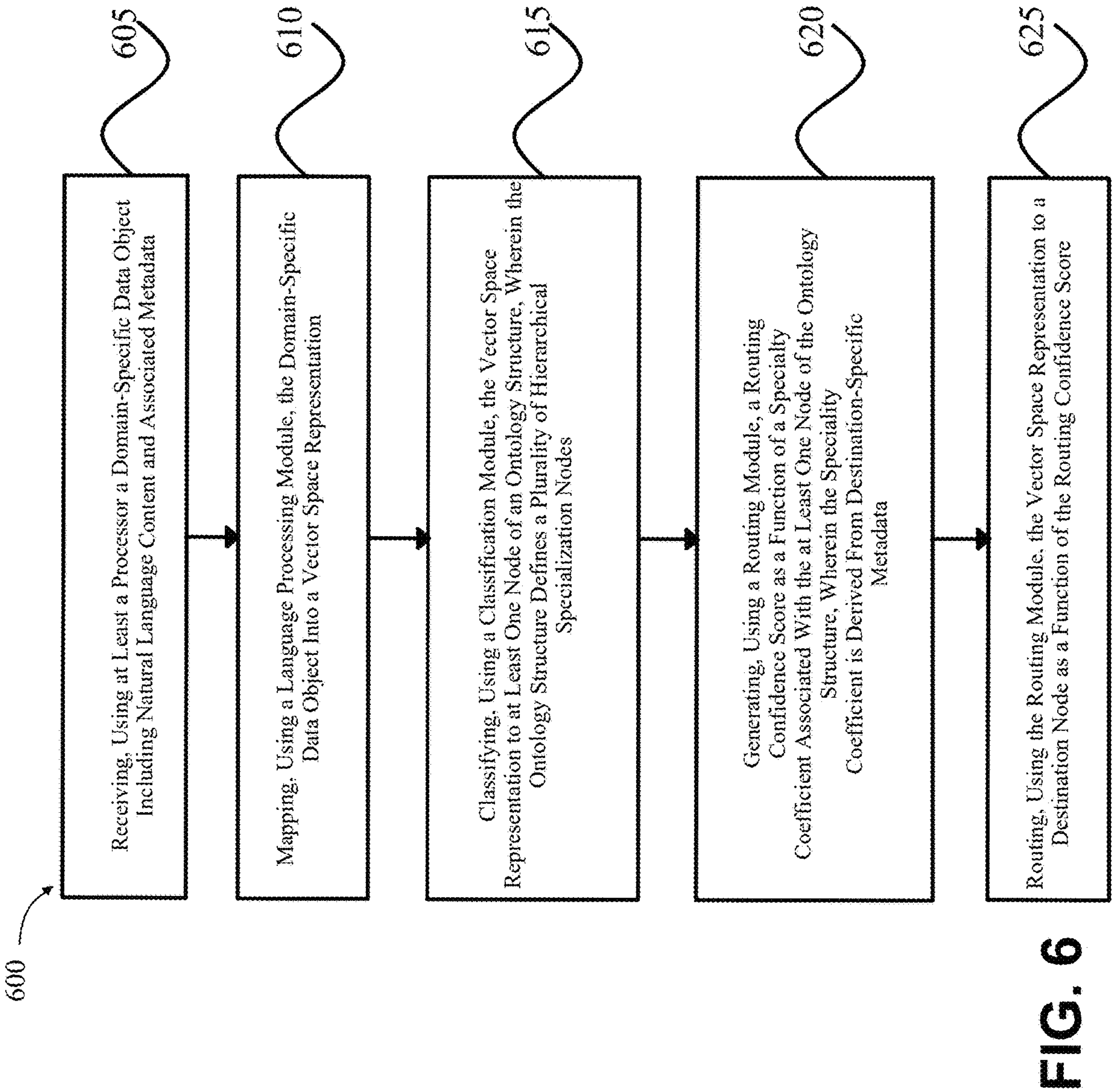
FIG. 6 is a flow diagram of an exemplary method for natural language classification and adaptive routing of domain-specific data objects.

Referring now to FIG. 6, a flow diagram of an exemplary method 600 of natural language classification and adaptive routing of domain-specific data objects is illustrated. Method 600 may include a step 605 of receiving, using the at least a processor, a domain-specific data object comprising natural-language content and associated metadata. In an embodiment, receiving the domain-specific data object may include receiving the domain-specific data object at an electronic communication interface. This may be implemented, without limitation, as described in reference to FIGS. 1-5.

In continued reference to FIG. 6, method 600 may include a step 610 of mapping, using a language processing module, the domain-specific data object into a vector space representation. In an embodiment, the language processing module comprises a language model that has been trained on a domain-specific text corpus and mapping the domain-specific data object into the vector space representation may include encoding the natural-language content of the domain-specific data object using the language model. This may be implemented, without limitation, as described in reference to FIGS. 1-5.

With further reference to FIG. 6, method 600 may include a step 615 of classifying, using a classification module, the vector space representation to at least one node of an ontology structure, wherein the ontology structure defines a plurality of hierarchical specialization nodes. In an embodiment, the ontology structure comprises a hierarchal graph defining the plurality of hierarchical specialization nodes and classifying the vector space representation to at least one node of the ontology structure may include mapping the vector space representation to one or more hierarchical specialization nodes of the plurality of hierarchical specialization nodes as a function of a similarity metric. This may be implemented, without limitation, as described in reference to FIGS. 1-5.

Still referring to FIG. 6, method 600 may include a step 620 of generating, using a routing module, a routing confidence score as a function of a specialty coefficient associated with the at least one node of the ontology structure, wherein the specialty coefficient is derived from destination-specific metadata. In an embodiment, the specialty coefficient may be received from an external processing pipeline configured to analyze destination-specific metadata and generate a coefficient representing an association strength between each hierarchical specialization node of the plurality of hierarchical specialization nodes. This may be implemented, without limitation, as described in reference to FIGS. 1-5.

In further reference to FIG. 6, method 600 may include calculating, using the routing module, the specialty coefficient, wherein calculating the specialty coefficient includes: retrieving destination-specific metadata for a plurality of destination nodes as a function of the at least one node of the ontology structure, encoding the destination-specific metadata for each destination node into a destination feature vector, receiving a ontology-node embedding corresponding to the at least one node of the ontology structure, generating, for each destination node, an association score between the destination feature vector and the ontology-node embedding, and generating the specialty coefficient as a function of normalizing the association score across the plurality of destination nodes. This may be implemented, without limitation, as described in reference to FIGS. 1-5.

With continued reference to FIG. 6, method 600 may include a step 625 of routing, using the routing module, the vector space representation to a destination node as a function of the routing confidence score. In an embodiment, the destination node is stored in a destination-node database and method 600 may further include accessing, using the at least a processor, the destination-node database and retrieve a destination node object representation as a function of the at least one node of the ontology structure. In an embodiment, routing the vector space representation to the destination node may include: retrieving the routing confidence score for each of a plurality of destination nodes, ranking the plurality of destination nodes as a function of the routing confidence score of each of the plurality of destination nodes, and selecting the destination node as a function of ranking the plurality of destination nodes. This may be implemented, without limitation, as described in reference to FIGS. 1-5.

Still referring to FIG. 6, method 600 may further include updating, using the at least a processor, the routing module as a function of performance outcomes, wherein updating the routing module includes: receiving feedback data associated with the domain-specific data object and the destination node, generating destination-level performance features as a function of the feedback data, generating an updated specialty coefficient by correlating the destination-level performance features with the at least one node of the ontology structure, and recalibrating the routing module as a function of the updated specialty coefficient. In an embodiment, recalibrating the routing module may include: detecting a recalibration trigger, updating the specialty coefficient of the at least one node of the ontology structure as a function of the updated specialty coefficient, and storing updated routing model parameters within the routing module for use in subsequent generation of routing confidence scores. This may be implemented, without limitation, as described in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
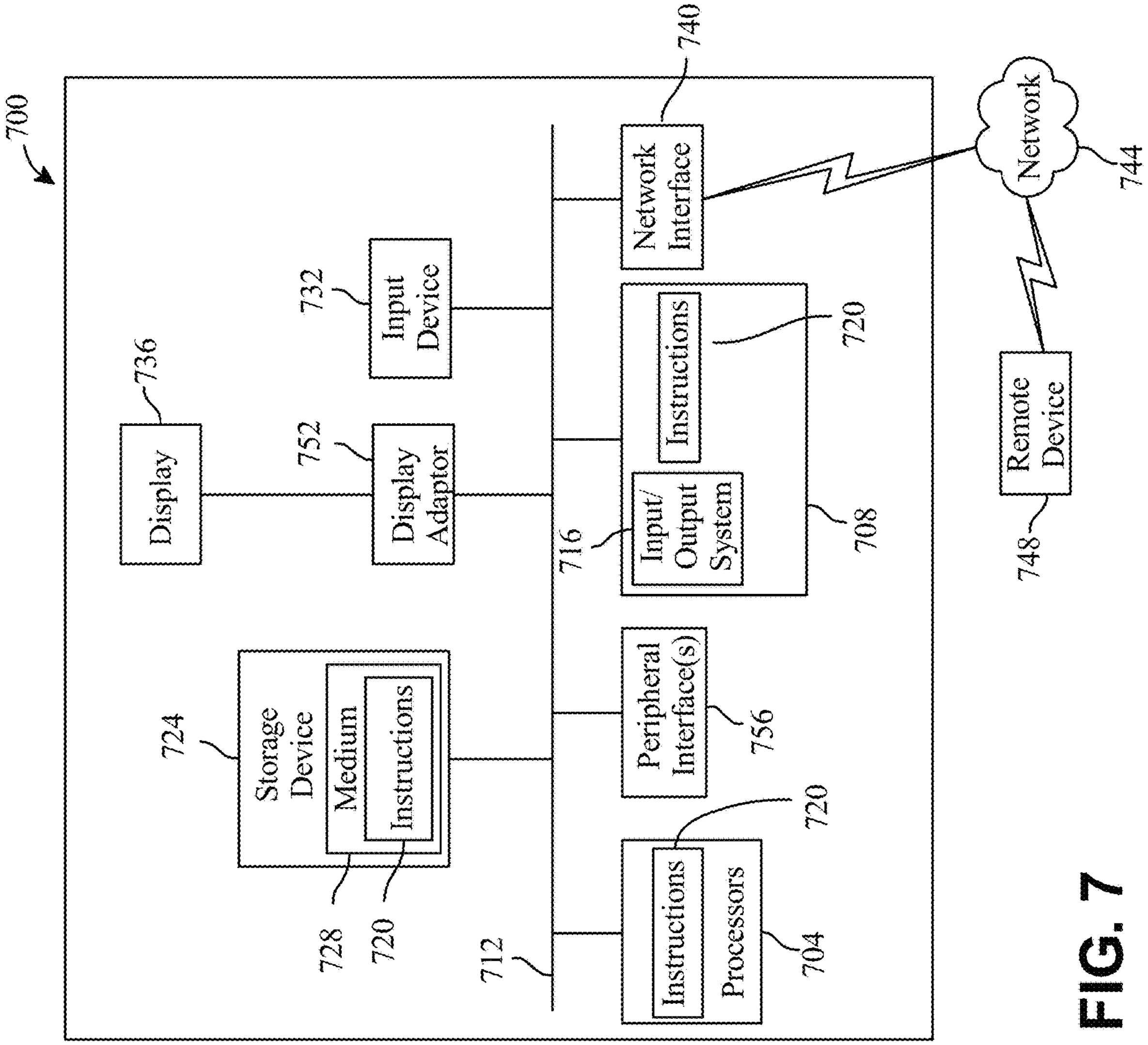
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for natural language classification and adaptive routing of domain-specific data objects, the system comprising:

at least a processor; and a memory communicatively connected to the at least a processor, wherein the memory contains instructions configuring the at least a processor to:

receive a domain-specific data object comprising natural-language content and associated metadata;

map, using a language processing module, the domain-specific data object into a vector space representation;

classify, using a classification module, the vector space representation to at least one node of an ontology structure, wherein the ontology structure defines a plurality of hierarchical specialization nodes;

generate, using a routing module, a routing confidence score as a function of a specialty coefficient associated with the at least one node of the ontology structure, wherein the specialty coefficient is derived from destination-specific metadata;

route, using the routing module, the vector space representation to a destination node as a function of the routing confidence score; and update the routing module as a function of performance outcomes, wherein updating the routing module comprises:

receiving feedback data associated with the domain-specific data object and the destination node;

generating destination-level performance features as a function of the feedback data;

generating an updated value for the specialty coefficient associated with the at least one node of the ontology structure by correlating the destination-level performance features with the at least one node of the ontology structure;

recalibrating the routing module as a function of the updated value for the specialty coefficient, wherein recalibrating the routing module comprises maintaining an exponential decay function over specialty coefficient updates to avoid overfitting to short-term fluctuations;

detecting a recalibration trigger;

updating the specialty coefficient of the at least one node of the ontology structure using the updated value for the specialty coefficient; and storing updated routing model parameters within the routing module for use in subsequent generation of routing confidence scores.

2. The system of claim 1, wherein receiving the domain-specific data object comprises receiving the domain-specific data object at an electronic communication interface.

3. The system of claim 1, wherein:

the language processing module comprises a language model that has been trained on a domain-specific text corpus; and mapping the domain-specific data object into the vector space representation comprises encoding the natural-language content of the domain-specific data object using the language model.

4. The system of claim 1, wherein:

the ontology structure comprises a hierarchal graph defining the plurality of hierarchical specialization nodes; and classifying the vector space representation to at least one node of the ontology structure comprises mapping the vector space representation to one or more hierarchical specialization nodes of the plurality of hierarchical specialization nodes as a function of a similarity metric.

5. The system of claim 1, wherein the at least a processor is further configured to calculate, using the routing module, the specialty coefficient, wherein calculating the specialty coefficient comprises:

retrieving destination-specific metadata for a plurality of destination nodes as a function of the at least one node of the ontology structure;

encoding the destination-specific metadata for each destination node into a destination feature vector;

receiving an ontology-node embedding corresponding to the at least one node of the ontology structure;

generating, for each destination node, an association score between the destination feature vector and the ontology-node embedding; and generating the specialty coefficient as a function of normalizing the association score across the plurality of destination nodes.

6. The system of claim 1, wherein the specialty coefficient is received from an external processing pipeline configured to analyze destination-specific metadata and generate a coefficient representing an association strength between each hierarchical specialization node of the plurality of hierarchical specialization nodes.

7. The system of claim 1, wherein:
- the destination node is stored in a destination-node database; and
- the at least a processor is further configured to:
  - access the destination-node database; and
  - retrieve a destination node object representation as a function of the at least one node of the ontology structure.

8. The system of claim 1, wherein routing the vector space representation to the destination node comprises:
- retrieving the routing confidence score for each of a plurality of destination nodes;
- ranking the plurality of destination nodes as a function of the routing confidence score of each of the plurality of destination nodes; and
- selecting the destination node as a function of ranking the plurality of destination nodes.

9. A method of natural language classification and adaptive routing of domain-specific data objects, the method comprising:
- receiving, using at least a processor, a domain-specific data object comprising natural-language content and associated metadata;
- mapping, using the at least a processor and a language processing module, the domain-specific data object into a vector space representation;
- classifying, using the at least a processor and a classification module, the vector space representation to at least one node of an ontology structure, wherein the ontology structure defines a plurality of hierarchical specialization nodes;
- generating, using the at least a processor and a routing module, a routing confidence score as a function of a specialty coefficient associated with the at least one node of the ontology structure, wherein the specialty coefficient is derived from destination-specific metadata;
- routing, using the at least a processor and the routing module, the vector space representation to a destination node as a function of the routing confidence score; and
- updating, using the at least a processor, the routing module as a function of performance outcomes, wherein updating the routing module comprises:
  - receiving feedback data associated with the domain-specific data object and the destination node;
  - generating destination-level performance features as a function of the feedback data;
  - generating an updated value for the specialty coefficient associated with the at least one node of the ontology structure by correlating the destination-level performance features with the at least one node of the ontology structure;
  - recalibrating the routing module as a function of the updated value for the specialty coefficient, wherein recalibrating the routing module comprises maintaining an exponential decay function over specialty coefficient updates to avoid overfitting to short-term fluctuations;
  - detecting a recalibration trigger;

- updating the specialty coefficient of the at least one node of the ontology structure using the updated value for the specialty coefficient; and
  - storing updated routing model parameters within the routing module for use in subsequent generation of routing confidence scores.

10. The method of claim 9, wherein receiving the domain-specific data object comprises receiving the domain-specific data object at an electronic communication interface.

11. The method of claim 9, wherein:
- the language processing module comprises a language model that has been trained on a domain-specific text corpus; and
- mapping the domain-specific data object into the vector space representation comprises encoding the natural-language content of the domain-specific data object using the language model.

12. The method of claim 9, wherein:
- the ontology structure comprises a hierarchal graph defining the plurality of hierarchical specialization nodes; and
- classifying the vector space representation to at least one node of the ontology structure comprises mapping the vector space representation to one or more hierarchical specialization nodes of the plurality of hierarchical specialization nodes as a function of a similarity metric.

13. The method of claim 9, further comprising calculating, using the routing module, the specialty coefficient, wherein calculating the specialty coefficient comprises:
- retrieving destination-specific metadata for a plurality of destination nodes as a function of the at least one node of the ontology structure;
- encoding the destination-specific metadata for each destination node into a destination feature vector;
- receiving an ontology-node embedding corresponding to the at least one node of the ontology structure;
- generating, for each destination node, an association score between the destination feature vector and the ontology-node embedding; and
- generating the specialty coefficient as a function of normalizing the association score across the plurality of destination nodes.

14. The method of claim 9, wherein the specialty coefficient is received from an external processing pipeline configured to analyze destination-specific metadata and generate a coefficient representing an association strength between each hierarchical specialization node of the plurality of hierarchical specialization nodes.

15. The method of claim 9, wherein:
- the destination node is stored in a destination-node database; and
- the method further comprises:
  - accessing, using the at least a processor, the destination-node database; and
  - retrieving a destination node object representation as a function of the at least one node of the ontology structure.

16. The method of claim 9, wherein routing the vector space representation to the destination node comprises:
- retrieving the routing confidence score for each of a plurality of destination nodes;
- ranking the plurality of destination nodes as a function of the routing confidence score of each of the plurality of destination nodes; and selecting the destination node as a function of ranking the plurality of destination nodes.

* * * * *